(12) United States Patent
Tang et al.

(10) Patent No.: US 11,499,614 B2
(45) Date of Patent: Nov. 15, 2022

(54) TILGER APPARATUS FOR USE WITH ROTATING BODIES

(71) Applicant: Valeo Kapec Co., Ltd., Daegu (KR)

(72) Inventors: Jialei Tang, Nanjing (CN); Jonathan Rost, Auburn Hills, MI (US); Fei Gan, Nanjing (CN); Zhen Duan, Nanjing (CN)

(73) Assignee: Valeo Kapec Co., Ltd., Daegu (KR)

( * ) Notice: Subject to any disclaimer, the term of this patent is extended or adjusted under 35 U.S.C. 154(b) by 0 days.

(21) Appl. No.: 17/419,131

(22) PCT Filed: Dec. 27, 2018

(86) PCT No.: PCT/CN2018/124383
§ 371 (c)(1),
(2) Date: Jun. 28, 2021

(87) PCT Pub. No.: WO2020/133075
PCT Pub. Date: Jul. 2, 2020

(65) Prior Publication Data
US 2022/0112942 A1    Apr. 14, 2022

(51) Int. Cl.
*F16H 45/02*    (2006.01)
*F16H 41/24*    (2006.01)
(Continued)

(52) U.S. Cl.
CPC ............ *F16H 45/02* (2013.01); *F16H 41/24* (2013.01); *F16H 2045/0231* (2013.01); *F16H 2045/0263* (2013.01)

(58) Field of Classification Search
CPC .. F16H 45/02; F16H 41/24; F16H 2045/0231; F16H 2045/0263; F16F 15/129; F16F 15/123
See application file for complete search history.

(56) References Cited

U.S. PATENT DOCUMENTS 7,896,130 B2 * 3/2011 Hill .................... F01N 1/166
                                                        181/254
8,161,739 B2    4/2012 Degler et al.
(Continued)

FOREIGN PATENT DOCUMENTS

CN        1336268 A      2/2002
CN      101883933 A     11/2010
(Continued)

OTHER PUBLICATIONS

International Search Report dated Oct. 9, 2019 in PCT/CN2018/124383, citing documents AO through AU therein, 5 pages.
(Continued)

*Primary Examiner* — Tinh Dang
(74) *Attorney, Agent, or Firm* — Oblon, McClelland, Maier & Neustadt, L.L.P.

(57) ABSTRACT

A tilger for a rotating body includes an annular body movably coupled to a rotatable portion of the rotating body. The tilger includes a spring interposed between the first annular body and the rotatable portion. Rotation of the rotatable portion relative to the annular body is to compress and decompress the spring. The tilger includes a ring positioned on an outer surface of the annular body and configured to expand as a rotational speed of the ring increases to decrease a total inertia of the annular body and the ring applied to the spring.

20 Claims, 8 Drawing Sheets

(51) Int. Cl.
*F16F 15/129* (2006.01)
*F16F 15/123* (2006.01)

(56) References Cited

U.S. PATENT DOCUMENTS

| | | | |
|---|---|---|---|
| 8,746,424 | B2 | 6/2014 | Kneidel |
| 10,030,740 | B2* | 7/2018 | Tomiyama ............ F16F 15/134 |
| 10,260,612 | B2* | 4/2019 | Kawahara ......... F16F 15/12353 |
| 10,352,423 | B2* | 7/2019 | Cai ....................... F16H 61/148 |
| 10,955,037 | B2* | 3/2021 | Watanabe ......... F16F 15/12353 |
| 2012/0073925 | A1 | 3/2012 | Kneidel |
| 2016/0129910 | A1* | 5/2016 | Amano ................. B60W 10/06 701/54 |
| 2016/0341293 | A1* | 11/2016 | Okaji ...................... F16H 45/02 |
| 2017/0108076 | A1* | 4/2017 | Watanabe ........... F16F 15/1202 |
| 2017/0268648 | A1* | 9/2017 | Kawahara ............... F16H 45/02 |

FOREIGN PATENT DOCUMENTS

| | | |
|---|---|---|
| CN | 102364158 A | 2/2012 |
| CN | 102678820 A | 9/2012 |
| CN | 103124864 A | 5/2013 |
| CN | 105626774 A | 6/2016 |
| CN | 205371451 U | 7/2016 |
| DE | 20 2010 018 591 U1 | 2/2018 |
| EP | 3 273 087 A1 | 1/2018 |
| GB | 2 044 394 A | 10/1980 |
| JP | 62-56644 A | 3/1987 |
| JP | 3-69340 U | 7/1991 |
| JP | 2015-98930 A | 5/2015 |
| WO | WO 2018/166727 A1 | 9/2018 |

OTHER PUBLICATIONS

Extended European Search Report issued in European Patent Application No. 18945197.4 dated Jul. 29, 2022.

* cited by examiner

TILGER APPARATUS FOR USE WITH ROTATING BODIES

TECHNICAL FIELD

This disclosure relates generally to vehicles and, more particularly, to tilger apparatus for use with rotating bodies.

BACKGROUND

Some motor vehicles having automatic transmission functionality employ fluid couplings such as torque converters that are interposed between an engine and a transmission to facilitate transferring torque therebetween. Typically, such torque converters utilize a lock up clutch and one or more dampers (e.g., tuned spring and mass dampers) that are configured to reduce torsional vibrations and/or sudden rotational movements generated by the engine when the lock up clutch is engaged, which increases part life for components of the transmission and/or other moving components of a vehicle driveline.

SUMMARY

An aspect of the present disclosure includes a tilger for a rotating body. The tilger includes an annular body movably coupled to a rotatable portion of the rotating body. The tilger also includes a spring interposed between the first annular body and the rotatable portion. Rotation of the rotatable portion relative to the annular body is to compress and decompress the spring. The tilger also includes a ring positioned on an outer surface of the annular body and configured to expand as a rotational speed of the ring increases to decrease a total inertia of the annular body and the ring applied to the spring.

In a further aspect of the present disclosure, the ring includes an inner surface that maintains engagement with the outer surface of the annular body while the rotational speed of the ring is below a first predetermined rotational speed.

In a further aspect of the present disclosure, the ring disconnects from the annular body when the rotational speed of the ring is at or above the first predetermined rotational speed.

In a further aspect of the present disclosure, the inner surface of the ring separates from the outer surface of the annular body to form a gap between the inner and outer surfaces when the rotational speed of the ring is at or above the first predetermined rotational speed.

In a further aspect of the present disclosure, the first annular body includes an annular groove positioned at or near an outer radius thereof in which the ring is positioned.

In a further aspect of the present disclosure, the annular groove defines first and second walls that extend along respective sides of the ring to prevent the ring from exiting the annular groove.

In a further aspect of the present disclosure, the ring is c-shaped such that the ring has first and second ends that are spaced from each other.

In a further aspect of the present disclosure, the first and second ends of the ring move away from each other as the ring expands to increase a diameter of the ring.

In a further aspect of the present disclosure, the ring includes a recessed area positioned thereon between the two ends to balance the ring.

In a further aspect of the present disclosure, the ring includes a first portion and a second portion that are movably coupled together.

In a further aspect of the present disclosure, the ring includes a first spring coupled between first ends of the respective first and second portions and a second spring coupled between second ends of the respective first and second portions to provide tension to the ring.

In a further aspect of the present disclosure, the ring is a first ring and the tilger further includes a second ring positioned on the first ring, the second ring configured to expand as a rotational speed of the second ring increases to further decrease the total inertia applied to the spring.

In a further aspect of the present disclosure, the second ring disconnects from the first ring when a rotational speed of the second ring is at or above a second predetermined rotational speed.

In a further aspect of the present disclosure, the rotating body is a vehicle torque converter and an outer surface of the second ring engages an inner surface of a cover or an impeller of the vehicle torque converter when the rotational speed of the second ring is at or above the second predetermined rotational speed.

In a further aspect of the present disclosure, the first ring disconnects from the first annular body when the rotational speed of the first ring is at or above a first predetermined rotational speed greater than the second predetermined rotational speed.

In a further aspect of the present disclosure, an outer surface of the first ring engages an inner surface of the second ring when the rotational speed of the first ring is at or above the first predetermined rotational speed.

In a further aspect of the present disclosure, the first and second rings have respective cross-sectional areas that are rectangular.

In a further aspect of the present disclosure, the rotating body is a vehicle torque converter.

In a further aspect of the present disclosure, the rotatable portion of the vehicle torque converter is a damper plate of a torsional damper consisting of a damper input portion, a damper output portion or an intermediate portion located among successive damping elements or a turbine shell.

In a further aspect of the present disclosure, an outer surface of the ring engages an inner surface of a cover or an impeller of the vehicle torque converter when the rotational speed of the ring is at or above the first predetermined rotational speed.

Another aspect of the present disclosure includes a vehicle torque converter. The vehicle torque converter includes a cover to receive an engine torque. The vehicle torque converter also includes an output portion to receive the engine torque from the cover and provide the engine torque to a vehicle transmission system. The vehicle torque converter also includes a damper system operatively interposed between the cover and the output portion to dampen relative rotational movement between the cover and the output portion when a clutch of the torque converter is in an engaged state. The damper system includes a rotatable portion and one or more rings supported by the rotatable portion that at least partially define a natural frequency of the damper system. Each of the one or more rings is configured to change between contracted and expanded states in response to rotation of the rotatable portion to change the natural frequency.

In a further aspect of the present disclosure, the one or more rings are configured to (a) successively disconnect from the rotatable portion as a rotational speed of the rotatable portion increases and (b) successively reconnect to the rotatable portion as the rotational speed decreases.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Figure 1:
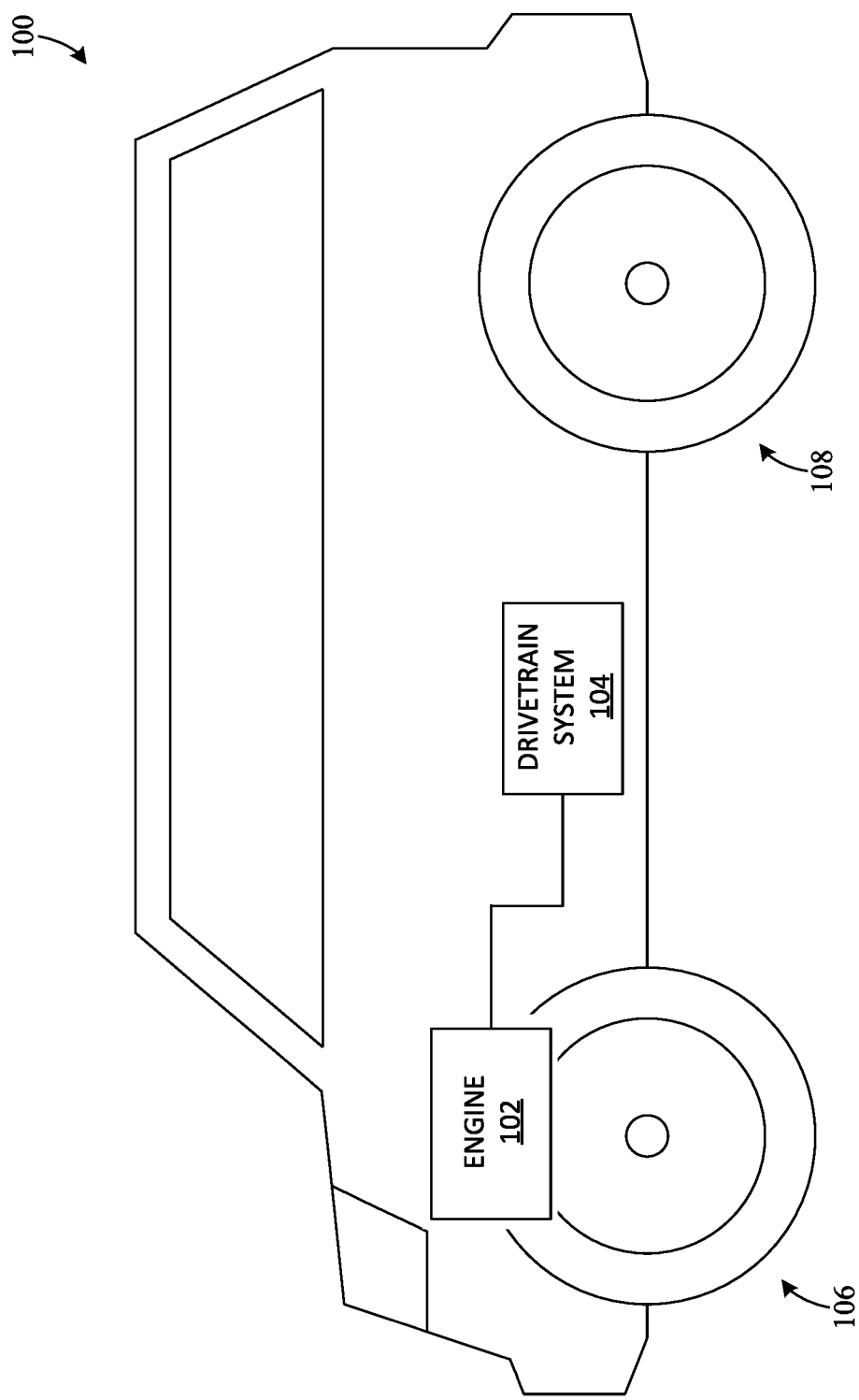
FIG. 1 is a schematic illustration of an example vehicle in which examples disclosed herein can be implemented.

Some known vehicle torque converters include known pendulum dampers that are configured to absorb torsional vibrations and/or sudden rotational movements generated by a vehicle engine. However, such known pendulum dampers are expensive to produce due to their complex designs and may generate noise during certain driving conditions (e.g., engine stop), which may be undesirable to a driver or vehicle owner. Some other known vehicle torque converters include known tilgers configured to absorb such torsional vibrations and/or sudden rotational movements. However, such known tilgers are tuned to a single natural frequency corresponding to a relatively low engine speed (e.g., about 1,500 revolutions per minute (RPM)), which is defined by an inertia and a spring stiffness associated with one of these known tilgers. As a result, at relatively high engine speeds (e.g., engine speeds greater than about 3,000 RPM), these known tilgers may fail to properly absorb the torsional vibrations and/or sudden rotational movements generated by the vehicle engine, which may wear, degrade and/or otherwise damage a vehicle transmission system and/or other vehicle driveline components.

Tilger apparatus for use with rotating bodies are disclosed. Examples disclosed herein provide an example tilger (e.g., a mass and a spring coupled to the mass) that is configured to operatively couple to a rotatable portion (e.g., damper plate of a torsional damper) of a rotating body such as a vehicle torque converter. Generally speaking, the disclosed tilger is configured to absorb torsional vibrations and/or sudden rotational movements provided to the torque converter from a vehicle engine when a clutch (e.g., a lock-up clutch) of the torque converter is in an engaged state. That is, the disclosed tilger dampens relative rotational movement between a cover of the torque converter and an output portion (e.g., a hub, a shaft connecting the torque converter to a vehicle transmission, etc.) of the torque converter, thereby reducing, mitigating, and/or eliminating harmful torsional vibrations and/or sudden rotational movements that would have otherwise been transferred from the engine to a transmission system and/or one or more other the driveline components. The disclosed tilger includes an annular body such as a plate, a disc, etc. (i.e., a mass) and one or more springs coupled to and/or interposed between the annular body and the rotatable portion of the torque converter such that, when the annular body and the rotatable portion partially rotate relative to each other, the spring(s) compress and decompress to provide a damping effect. The annular body and the spring(s) are sized and/or shaped to define a particular or predetermined natural frequency of the tilger corresponding to a range of engine speeds in which these torsional vibrations and/or rotational movements are effectively absorbed. In particular, as a rotational speed of the tilger increases during engine operation (i.e., as a speed of the engine increases), disclosed examples increase the natural frequency of the tilger. Conversely, as the rotational speed of the tilger decreases during engine operation (i.e., as the speed of the engine decreases), disclosed examples decrease the natural frequency of the tilger. As a result, disclosed examples improve tilger performance across a substantially wide range of engine speeds, which would have otherwise been unattainable using the above-mentioned known tilgers and/or torque converters. Further, disclosed examples reduce costs that would have otherwise been incurred by using the above-mentioned known pendulums.

Some disclosed examples provide one or more example rings (e.g., one or more snap rings and/or c-shaped rings) that are adjustably or non-fixedly coupled to the annular body such that the ring(s) can detach from the annular body during certain driving conditions. For example, a first disclosed ring is positioned on an outer surface (e.g., a curved and/or circular surface) of the annular body and is sized, shaped, structured, and/or otherwise configured to couple or connect to (e.g., via tension of the first ring) the annular body when a rotational speed of the annular body is below a predetermined rotational speed (e.g., 1500 RPM) such that the first ring and the annular body rotate cooperative or simultaneously. This predetermined rotational speed is sometimes referred to as disengagement speed and/or a re-engagement speed. When the rotational speed of the annular body is below the first predetermined rotational speed, the annular body experiences the inertia of the first ring whereby the first ring partially defines the natural frequency of the tilger. In particular, as the rotational speed of the annular body increases and/or is at or above the first predetermined rotational speed, centrifugal or rotational forces experienced by the first ring cause the first ring to expand (e.g., a radius or diameter of the first ring increases) to substantially decouple or disconnect from the annular body. As a result of this expansion of the first ring, a total inertia of the annular body and the first ring applied to the spring(s) decreases and, thus, the natural frequency of the tilger increases. Conversely, as the rotational speed of the annular body decreases and/or is below the first predetermined rotational speed, the tension of the first ring causes the first ring to contract (e.g., the radius or diameter of the first ring decreases) to recouple or reconnect to the annular body. As a result of this contraction of the first ring, the total inertia of the annular body and the first ring applied to the spring(s) increases and, thus, the natural frequency of the tilger decreases. Thus, the disclosed tilger has a variable and/or an adjustable inertia that changes based on engine speed.

Additionally, some disclosed examples provide more than one (e.g., 2, 3, 4, etc.) of these disclosed rings that are positioned on the annular body to further improve tilger performance at even higher rotational speeds, as discussed further below in connection with FIGS. 2-11. In particular, in such examples, each of the rings is configured to decouple or disconnect from the annular body at or near a unique predetermined rotational speed of the annular body. Thus, as the rotational speed of the annular body increases, the rings expand to successively detach from the annular body according to a first order. Conversely, as the rotational speed of the annular body decreases, the rings contract to successively recouple or reconnect to the annular body according to a second order opposite the first order. In this manner, disclosed examples improve tilger performance for a substantially large range of engine speeds.

In some examples, the disclosed ring(s) include one or more example features that facilitate controlling expansion and/or contraction of the ring(s). For example, the first disclosed ring includes a single portion that is c-shaped such that the first ring has two opposing ends to facilitate bending of the first ring (i.e., changing the radius and/or the diameter of the first ring) when the first ring experiences the centrifugal or rotational forces. In some such examples, the first ring also includes an example recessed area (e.g., a notch) positioned thereon between the two ends, which balances the first ring and/or better enables the first ring to bend by decreasing a strength and/or rigidity of the first ring (i.e., by weakening the first ring). In some other examples, the first ring includes multiple portions (e.g., c-shaped portions and/or semi-circular shaped portions) that are movably coupled together via springs interposed between the portions to provide tension to the first ring.

FIG. 1 is a view of an example vehicle (e.g., a car, a truck, a sport utility vehicle (SUV), etc.) 100 in which examples disclosed herein can be implemented. According to the illustrated example of FIG. 1, the vehicle 100 includes an example engine (e.g., an internal combustion engine) 102, an example drivetrain system 104 (sometimes referred to as a driveline), and one or more examples wheels 106, 108 (sometimes referred to as road wheels), two of which are shown in this examples, (i.e., a first or front wheel 106 and a second or rear wheel 108). The drivetrain system 104 of FIG. 1 is structured and/or configured to transfer torque from the engine 102 to the wheel(s) 106, 108 to cause the vehicle 100 to move, for example, via one or more drive shafts, one or more clutches, one or more axles, a fluid coupling (e.g., a torque converter), a transmission system (e.g., an automatic transmission), etc., as discussed further below. For example, the engine 102 generates a torque (sometimes referred to as an engine torque) and, in response, the drivetrain system 104 controls an amount or degree of the engine torque that is provided to the wheel(s) 106, 108. In some examples, the vehicle 100 has rear-wheel drive functionality such that the drivetrain system 104 provides the engine torque to only the rear vehicle wheel(s) 108. However, in other examples, the vehicle 100 may be implemented differently (e.g., having front-wheel drive and/or all-wheel drive functionality).

In some examples, the vehicle 100 includes a controller (e.g., an electronic control unit (ECU)) that is configured to change a state of a torque converter clutch (e.g., a lock up clutch) between a first state (e.g., an engaged state) and a second state (e.g., a disengaged state). For example, the vehicle controller is communicatively coupled to an actuator system that is associated with the drivetrain system 104 and operatively coupled to the torque converter clutch, for example, via a transmission or signal wire, a bus (e.g., a controller area network (CAN)), radio frequency, etc. In such examples, the vehicle controller transmits power and/or a control or command signal to the actuator system and/or otherwise controls the actuator system to cause a movable component (e.g., a piston) of the actuator system to change the clutch between the first and second states.

Figure 2:
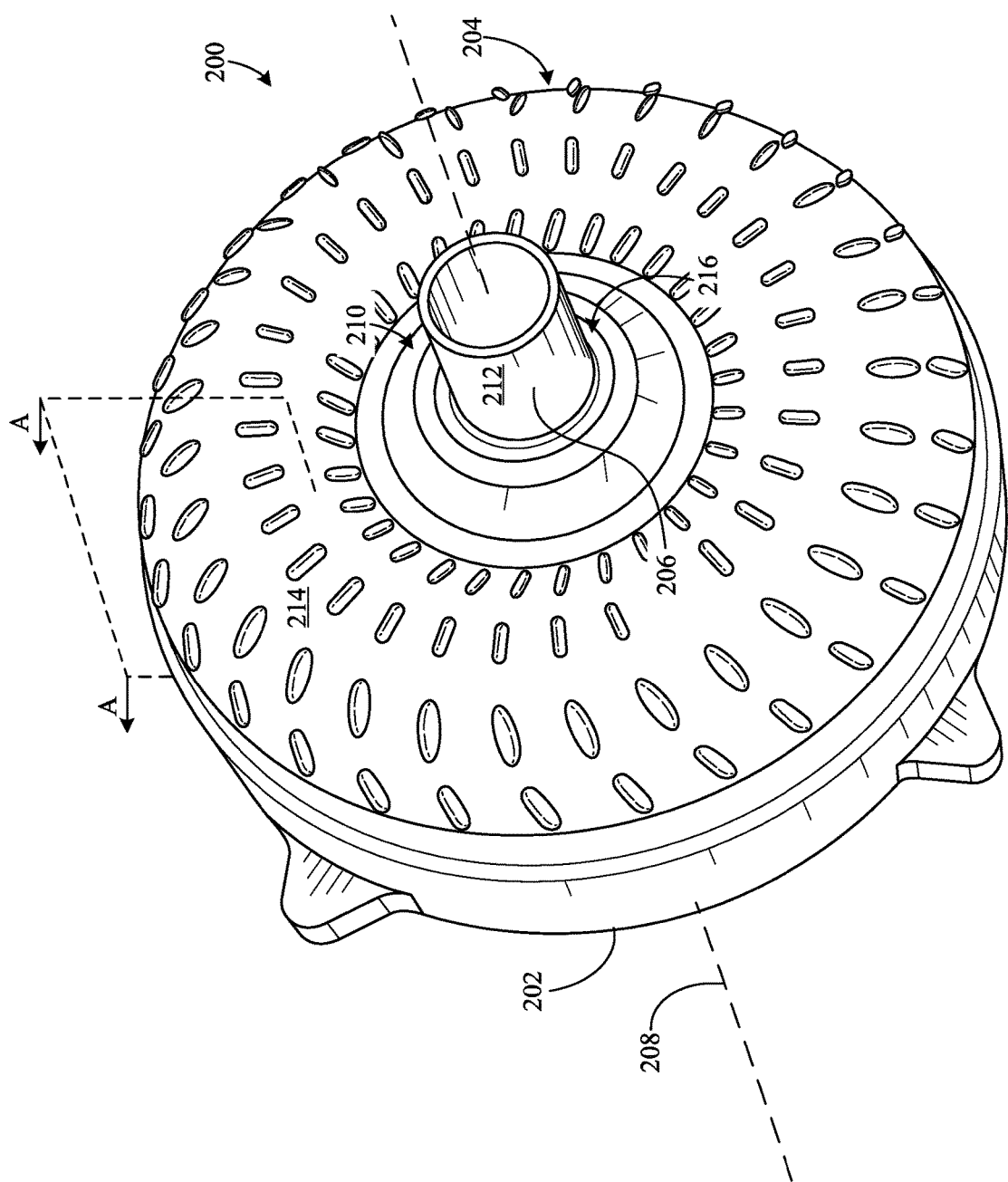
FIG. 2 is a view of an example vehicle torque converter in which examples disclosed herein can be implemented.

FIG. 2 is a view of an example vehicle torque converter 200 in which examples disclosed herein can be implemented. In some examples, the torque converter 200 of FIG. 2 is used to implement at least a portion of the drivetrain system 104 of FIG. 1. According to the illustrated example of FIG. 2, the torque converter 200 includes an example cover 202, an example impeller 204, and an example shaft (e.g., an output shaft) 206. In some examples, the shaft 206 is part of a vehicle transmission system (e.g., an automatic transmission system) and, in such examples, the shaft 206 is an input shaft of the transmission. In particular, the torque converter 200 is configured and/or structured to operatively couple between the engine 102 and the transmission system to facilitate transferring torque therebetween. For example, the torque converter allows the engine 102 to remain in operation while the vehicle 100 is stopped (e.g., when vehicle brakes are applied) and/or otherwise not moving without causing the engine 102 to stall. In some examples, when driving the vehicle 100 at certain speeds, the torque converter 200 increases or multiplies the engine torque provided to the transmission and/or the wheel(s) 106, 108.

The cover 202 of FIG. 2 is structured and/or configured to couple to a component (e.g., a flywheel and/or a crankshaft) associated with the engine 102 to receive a torque (i.e., an engine torque) or output from the engine 102. In particular, the output of the engine 102 causes the cover 202 and the impeller 204 to rotate relative to an example axis 208 associated therewith. In response to such rotation, the torque converter 200 generates a torque for the shaft 206 based on the engine torque and/or otherwise transfers (e.g., via a damper assembly) at least a portion of the engine torque from the engine 102 to the shaft 206. In some examples, the torque converter 200 is implemented with an example flywheel that is relatively non-rotatably (i.e., fixedly) coupled to the cover 202.

The impeller 204 of FIG. 2 is relatively non-rotatably (i.e., fixedly) coupled to the cover 202, for example, via one or more example fasteners and/or one or more example fastening methods or techniques (e.g., welding). As such, the impeller 204 and the cover 202 rotate cooperatively or simultaneously relative to the axis 208. In particular, when the impeller 204 rotates relative to the axis 208, the impeller 204 is structured and/or configured to control a flow of an example fluid (e.g., oil) 318 (shown in FIG. 3) within the torque converter 200, for example, via one or more of fins, blades, vanes, and/or any other appropriate fluid flow control member associated with controlling fluid flow. Such fluid is sometimes referred to as transmission fluid.

In some examples, the shaft 206 of FIG. 2 is relatively rotatably coupled to the impeller 204, for example, via an example bearing 210 interposed between an outer surface (e.g., a curved and/or circular surface) 212 of the shaft 206 and a surface (e.g., an inner surface) 214 of the impeller 204. As such, the shaft 206 and the impeller 204 can rotate independently relative to each other. In particular, the shaft 206 is structured and/or configured to transfer torque from the torque converter 200 to the transmission system of the vehicle 100. For example, the shaft 206 extends at least partially through the impeller 204 via an example opening 216 positioned thereon to relatively non-rotatably (i.e., fixedly) couple to one or more components (e.g., one or more of turbine, a portion of a damper, a hub, etc.) of the torque converter 200 and receive torque therefrom. As such, the shaft 206 and the torque converter component(s) rotate cooperatively or simultaneously relative to the axis 208 and/or otherwise transfer torque therebetween. Further, the shaft 206 also operatively couples (e.g., directly or via one or more intermediate components) to a portion (e.g., a gearbox) of the transmission system to provide torque generated by the torque converter 200 thereto, thereby driving the wheel(s) 106, 108.

Figure 3:
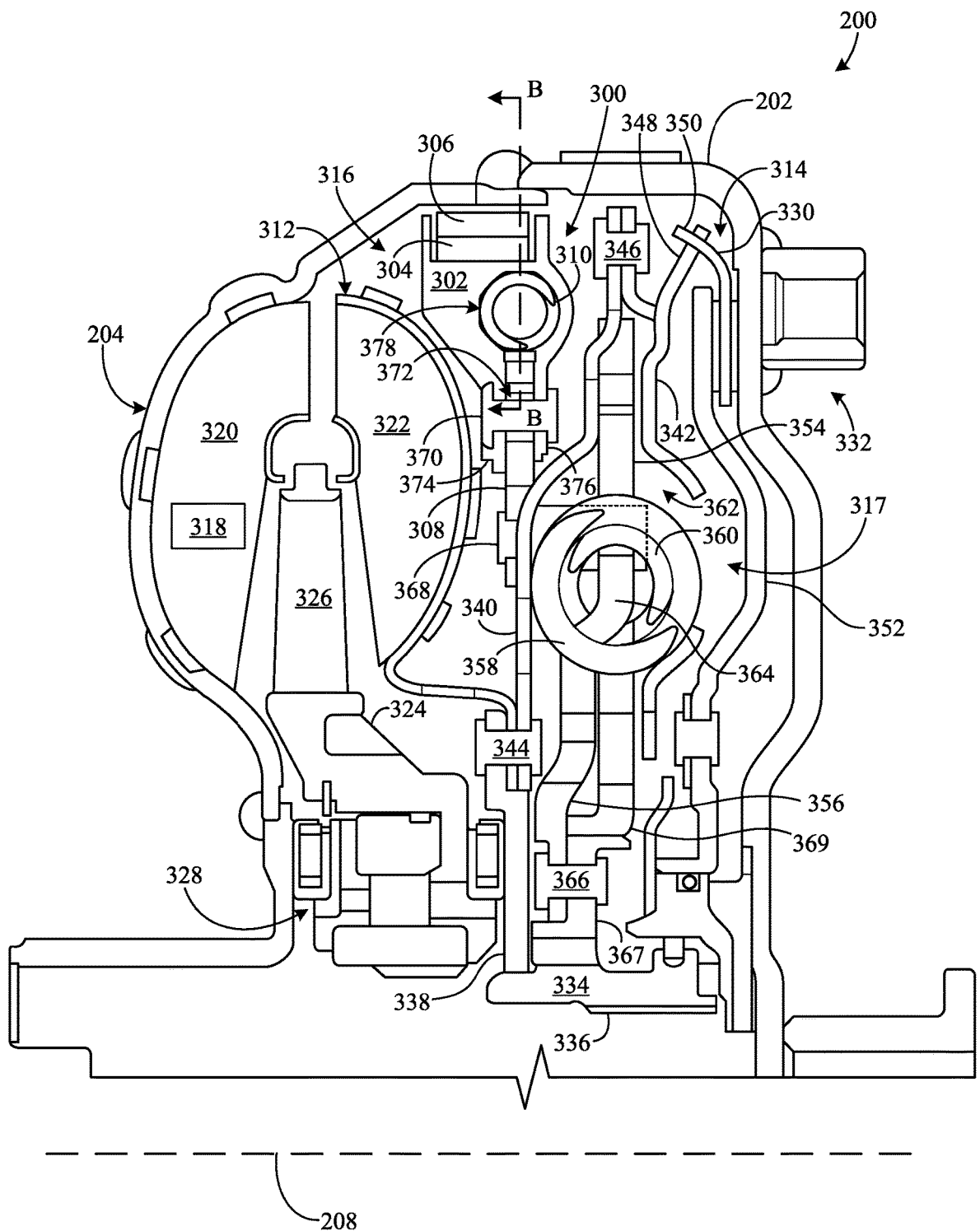
FIG. 3 is a partial cross-sectional view of the example torque converter of FIG. 2 along line A-A and shows an example damper assembly in accordance with the teachings of this disclosure.

FIG. 3 is a partial cross-sectional view of the torque converter 200 of FIG. 2 along line A-A and shows a first example damper assembly (e.g., a tilger) 300 in accordance with the teachings of this disclosure, which is sometimes referred to as a spring and mass damper. According to the illustrated example of FIG. 3, the first damper assembly 300 includes a first example annular body (e.g., a disc or plate) 302 and one or more example rings 304, 306 positioned on the first annular body 302 such that the first annular body 302 carries and/or supports the ring(s) 304, 306, two of which are shown in this example (i.e., a first ring 304 and a second ring 306). The first annular body 302 is sometimes referred to as a rotatable portion, and the rings 304, 306 are sometimes referred to as inertia rings. During operation of the torque converter 200, the engine torque causes the first annular body 302, the ring(s) 304, 306, and/or, more generally, the first damper assembly 300 to rotate relative to the axis 208. In particular, each of the ring(s) 304, 306 is sized, shaped, structured, and/or otherwise configured expand and/or contract based on an angular or rotational speed (i.e., a rate of rotation) of the first damper assembly 300 relative to the axis 208, which changes an inertia and/or a mass experienced by the first annular body 302 and, thus, changes a natural frequency associated with the first damper assembly 300, as discussed further below in connection with FIGS. 4-11.

In some examples, first annular body 302 of FIG. 3 is movably or relatively rotatably coupled to a second example annular body (e.g., a disc or plate) 308 such that the first and second annular bodies 302, 308 can partially rotate relative to each other (e.g., by about 5 degrees, 10 degrees, 15 degrees, etc.). In such examples, the first damper assembly 300 also includes one or more example damping elements (e.g., one or more springs such as coil spring(s)) 310 operatively coupled to and/or interposed between the first and second annular bodies 302, 308 to dampen relative rotational movement therebetween, one of which is shown in this example. The damping element(s) 310 are sometimes referred to as torsional vibration damper(s). In particular, as the first and second annular bodies 302, 308 partially rotate relative to each other, the first and second annular bodies 302, 308 compress and decompress the damping element(s) 310 to provide a damping effect. Stated differently, rotation of the second annular body 308 relative to the first annular body 302 causes the damping element(s) 310 to compress and decompress. For example, each of the damping element(s) 310 has a first end that engages a portion of the first annular body 302 and a second end, opposite the first end, that engages a portion of the second annular body 308.

According to the illustrated example of FIG. 3, the torque converter 200 includes an example turbine 312, a first example clutch (e.g., a lock-up clutch) 314, and an example damper system 316. The damper system 316 of FIG. 3 is operatively interposed between the cover 202 and the shaft 206 (and/or an example output portion 334 of the torque converter 200), which facilitates and/or improves torque transferred from the cover 202 (i.e., from the engine 102) to the shaft 206 when the first clutch 314 is in an engaged state. The damper system 316 includes the first damper assembly 300 and, in some examples, also includes at least a second example damper assembly (e.g., a torsional damper) 317. In particular, the damper system 316 is structured and/or configured to dampen relative rotational movement between the cover 202 and the shaft 206. That is, the damper system 316 substantially prevents the shaft 206 from experiencing torsional vibrations and/or sudden rotational movements during operation of the engine 102. As a result, the damper system 316 increases part life of component(s) of the vehicle transmission system and/or other moving component(s) associated with the drivetrain system 104.

The turbine 312 of FIG. 3 is configured to receive the aforementioned fluid 318 from the impeller 204 during engine operation, thereby generating torque for the shaft 206. For example, the impeller 204 includes one or more example fluid flow control members (e.g., fins, blades, vanes) 320 positioned thereon that are radially distributed relative to the axis 208 and extend radially outward relative to the axis 208. Similarly, the turbine 312 includes one or more example fluid flow control members (e.g., fins, blades, vanes, etc.) 322 positioned thereon that are radially distributed relative to the axis 208 and extend radially outward relative to the first axis 208. As the fluid flow control members 320 of the impeller 204 rotate cooperatively or simultaneously with the cover 202 relative to the axis 208, the fluid 318 is urged and/or pumped radially outward relative to the axis 208 toward the fluid flow control members 322 of the turbine 312. That is, the fluid flow control members 320 of the impeller 204 direct a flow the fluid 318 onto the fluid flow control members 322 of the turbine 312. As a result of the fluid 318 imparting fluid force(s) on the fluid flow control members 322 of the turbine 312, the turbine 312 generates torque, a degree of which is based on one or more parameters associated with the torque converter 200 such as, for example, one or more of a rotational speed of the impeller 204, a rotational speed of the turbine 312, angles of the respective fluid flow control members 320, 322, lengths of the respective fluid flow control members 320, 322, properties (e.g., viscosity) of the fluid 318, etc.

In some examples, to increase the torque generated by the turbine 312 during certain driving conditions, the torque converter 200 also includes an example stator 324 operatively interposed between the impeller 204 and the turbine 312. The stator 324 of FIG. 3 includes one or more fluid flow control members (e.g., fins, blades, vanes, etc.) 326 that are radially distributed relative to the axis 208 and extend radially outward relative to the axis 208. In particular, the fluid flow control members 326 of the stator 324 are configured to change a flow direction of the fluid 318 from the turbine 312 to the impeller 204, which increases efficiency of the impeller 204 in pumping the fluid 204 and/or, more generally, increases efficiency of the torque converter 200. For example, as the turbine 312 rotates, the fluid flow control members 322 of the turbine 312 direct the fluid 318 onto the fluid flow control members 326 of the stator 324 in a first direction and, in response, the fluid flow control members 326 of the stator 324 direct the fluid 318 onto the fluid flow control members 320 of the impeller 204 in a second direction different from the first direction. Such control of the fluid 318 may cause the stator 324 to rotate relative to the axis 208 (e.g., at relatively high speeds of the vehicle 100). However, in some examples, to limit rotation of the stator 324, the torque converter 200 also includes a second example clutch (e.g., a one-way clutch) 328 operatively coupled to the stator 324 and interposed between the impeller 204 and the turbine 312. In particular, the second clutch 328 is configured to prevent the stator 324 from rotating relative to the axis 208 in a single direction (e.g., clockwise or counter clockwise).

The first clutch 314 of FIG. 3 includes an example plate 330 and an actuator system (e.g., one or more of an electro-magnetic actuator system, a hydraulic actuator system, etc.) 332 configured to interact with the plate 330 and/or otherwise operate the first clutch 314. In particular, the plate 330 is connected (e.g., directly or via one or more intermediate components) to the aforementioned output portion (e.g., a hub and/or a cylindrical body) 334 of the torque converter 200 to transfer engine torque from the cover 202 to the output portion 334 when the first clutch 314 is in the engaged state. The output portion 334 is sometimes referred to as a hub and/or an output hub. As such, the clutch plate 330 and the output portion 334 are configured to rotate cooperatively or simultaneously relative to the axis 208 when the first clutch 314 is in the engaged state or the disengaged state. The output portion 334 of FIG. 3 is configured to receive the shaft 206 and provide the torque generated by the turbine 312 thereto. For example, the output portion 334 defines an inner surface (e.g., a curved and/or circular surface) 336 that has splines positioned thereon, and the outer surface 212 of the shaft 206 also has splines positioned thereon. In such examples, when the shaft 206 is positioned in and/or otherwise relatively non-rotatably (i.e., fixedly) coupled to the output portion 334, the shaft 206 and the output portion 334 are splined together such that the shaft 206 and the output portion 334 rotate cooperatively or simultaneously relative to the axis 208 and/or otherwise transfer torque therebetween.

In some examples, to facilitate coupling the turbine 312 and the clutch plate 330 together and/or supporting the turbine 312 and the clutch plate 330, the torque converter 200 also includes an example support portion 338 (e.g., a disc or plate) positioned on or near the output portion 334 that extends radially outward relative to the axis 208 to receive a portion of the turbine 312 and/or a portion associated with the first clutch 316. For example, as shown in FIG. 3, the first clutch 316 also includes a third example annular body (e.g., a disc or plate) 340 and a fourth example annular body (e.g., a plate or disc) 342 that are interposed between the clutch plate 330 and the output portion 334. In such examples, the third annular body 340 is relatively non-rotatably (i.e., fixedly) coupled the turbine 312 and the support portion 338, for example, via one or more example fastening methods or techniques (e.g., welding) and/or one or more example fasteners (e.g., bolt(s), stud(s), rivet(s)) 344. As shown in FIG. 3, the fastener(s) 344, which may be radially distributed relative to the axis 208, extend through a portion of the turbine 312, a portion of the support portion 338, and a portion of the third annular body 340, which allows the turbine 312, the support portion 338, and the third annular body 340 to transfer torque therebetween. Additionally, the third and fourth annular bodies 340, 342 of FIG. 3 are relatively non-rotatably (i.e., fixedly) coupled together, for example, via one or more example fastening methods or techniques and/or one or more example fasteners 346. As shown in FIG. 3, the fastener(s) 346, which may be radially distributed relative to the axis 208, extend through the third and fourth annular bodies 340, 342 and are positioned at or near respective outer radii of the third and fourth annular bodies 340, 342, which allows the third and fourth annular bodies 340, 342 to transfer torque therebetween.

In some examples, to facilitate transferring torque between the clutch plate 330 and the third and fourth annular bodies 340, 342, the fourth annular body 342 includes one or more connecting portions (e.g., tab(s) and/or protrusion(s)) 348 extending radially outward relative to the axis 208 and/or toward the clutch plate 330 to receive the clutch plate 330. The connection portion(s) 348 of the fourth annular body 342 may be radially distributed relative to the axis 208. Similarly, in such examples, the clutch plate 330 also includes one or more connecting portions (e.g., tab(s) and/or protrusion(s)) 350 extending radially outward relative to the axis 208 and/or toward the connecting portion(s) 348 of the fourth annular body 342 to receive the connecting portion(s) 348. In particular, the connecting portion(s) 348 of the fourth annular body 342 are configured to engage respective ones of the connecting portion(s) 350 of the clutch plate 330, thereby transferring torque between the clutch plate 330 and the third and fourth annular bodies 340, 342.

As a result, according to the illustrated example of FIG. 3, the turbine 312, the clutch plate 330, the support portion 338, the third annular body 340, and the fourth annular body 342 rotate cooperatively or simultaneously relative to the axis 208 during operation of the torque converter 200. On the other hand, in examples where the torque converter 200 includes the second damper assembly 317, the turbine 312, the clutch plate 330, the support portion 338, the third annular body 340, and the fourth annular body 342 at least partially rotate relative to the output portion 334 during operation of the torque converter 200 resulting from the second damper assembly 317 absorbing the torsional vibrations and/or sudden rotational movements of the engine 102. For example, as shown in FIG. 3, an inner surface (e.g., a curved and/or circular surface) of the support portion 338 slidably engages an outer surface (e.g., a curved and/or a circular surface) of the output portion 334.

In some examples, to change the state of the first clutch 314, the actuator system 332 of FIG. 3 includes an example piston 352 that is configured to move along the axis 208 relative to (e.g., toward and/or away from) the clutch plate 330 to engage the clutch plate 330 and substantially disengage from the clutch plate 330. In this manner, the actuator system 332 and the piston 352 provide the engaged state and the disengaged state of the first clutch 314. For example, the controller of the vehicle 100 controls the actuator system 332 to impart a force on the piston 352 (e.g., via generating one or more of a magnetic field, a fluid pressure, etc.), which causes the piston 352 to move. As a result, the clutch plate 330 is squeezed and/or clamped between the piston 352 and the cover 202, thereby transferring torque from the cover 202 to the output portion 334 of the torque converter 200. As such, when the first clutch 314 of FIG. 3 is in the engaged state, the cover 202 and the clutch plate 330 substantially rotate cooperatively or simultaneously relative to the axis 208.

The second damper assembly 317 of FIG. 3 forms at least part of the first clutch 314 and is operatively interposed between the clutch plate 330 and the output portion 334. The second damper assembly 317 of FIG. 3 includes a fifth example annular body (e.g., a disc or plate) 354 and a sixth example annular body (e.g., a disc or plate) 356 that are movably or relatively rotatably coupled together such that the fifth and sixth annular bodies 354, 356 can partially rotate relative to each other (e.g., by about 5 degrees, 10 degrees, 15 degrees, etc.). The fifth annular body 354 is sometimes referred to as a damper back plate and/or a damper input, and the sixth annular body 356 is sometimes referred to as a damper drive plate and/or damper output. In particular, the second damper assembly 317 of FIG. 3 includes one or more example primary damping elements (e.g., one or more springs such as coil spring(s)) 358 interposed between the fifth and sixth annular bodies 354, 356 to provide a damping effect when the primary damping elements 358 are compressed and/or decompressed, one of which is shown in this example. The primary damping element(s) 358 may be radially distributed relative to the axis 208. Additionally, in some examples, the second damper assembly 317 similarly includes one or more secondary damping elements (e.g., one or more relatively small springs such as coil spring(s)) 360 interposed between the fifth and sixth annular bodies 354, 356 to improve the damping effect when the secondary damping element(s) 360 are compressed and/or decompressed, one of which is shown in this example. The secondary damping element(s) 360 may be radially distributed relative to the axis 208. In such examples, the secondary damping element(s) 360 are positioned within respective ones of the primary damping elements 358. The primary and secondary damping elements 358, 360 are sometimes referred to as torsional vibration dampers.

In some examples, to facilitate carrying the primary damping element(s) 358 and/or the secondary damping element(s) 360, the third and fourth annular bodies 340, 342 of the first clutch 314 form and/or define one or more example cavities (e.g., annular shaped cavities) 362 (sometimes referred to as spring cavities) to receive respective ones of the primary damping element(s) 358 and/or the secondary damping element(s) 360, one of which is shown in this example. That is, the primary damping element(s) 358 and/or the secondary damping element(s) 360 are positioned within and/or extend through respective ones of the spring cavities 362.

In some examples, to facilitate compressing and decompressing the damping element(s) 358, 360 of the second damper assembly 317, the sixth annular body 356 includes one or more example abutting portions 364 positioned thereon and extending radially outward relative to the axis 208 to receive respective ones of the damping element(s) 358, 360. The abutting portion(s) 364 may be radially distributed relative to the axis 208. In particular, each of the damping element(s) 358, 360 has a first end that engages one of the abutting portion(s) 364 and a second end, opposite the first end, that engages a portion of the fifth annular body 354. As such, when the fifth and sixth annular bodies 354, 356 partially rotate relative to each other, the fifth and sixth annular bodies 354, 356 compress and decompress the damping element(s) 358, 360.

In some examples, the sixth annular body 356 is relatively non-rotatably (i.e., fixedly) coupled to the output portion 336 of the torque converter 200, for example, via one or more example fastening methods or techniques and/or one or more example fasteners 366, one of which is shown in this example. As shown in FIG. 3, the fastener(s) 366, which may be radially distributed relative to the axis 208, extend through an example flange 367 of the output portion 336 and a portion the sixth annular body 356 such that the output portion 336 and the sixth annular body 356 rotate cooperatively or simultaneously relative to the axis 208, which allows torque transfer between the output portion 336 and the sixth annular body 356. The flange 367 of FIG. 3 is positioned on and/or formed by the output portion 334 and extends away from the output portion 334 radially outward relative to the axis 208 to receive the fifth annular body 354 and/or the sixth annular body 356. Further, to allow the fifth annular body 354 to at least partially rotate relative to the sixth annular body 356 and/or the output portion 334, the fifth annular body 354 includes an abutment portion (e.g., an inner radial portion) 369 positioned at or near an inner radius of the fifth annular body 354. In such examples, the abutment portion 369 has an inner surface (e.g., a curved and/or circular surface) configured to slidably engage an outer surface (e.g., a curved and/or circular surface) of the flange 367.

In some examples, the first damper assembly 300 is coupled to a portion of the second damper assembly 317, for example, via one or more example fastening methods or techniques and/or one or more examples fasteners 368. As shown in FIG. 3, the second annular body 308 is positioned on the third annular body 340, and the fasteners 368, which may be radially distributed relative to the axis 208, extend through the second annular body 308, the third annular body 340, and the fifth annular body 354, which allows torque transfer between the second annular body 308, the third annular body 340, and the fifth annular body 354. In some such examples, the fastener(s) 368 are positioned between the primary damping element(s) 358 and/or the secondary damping element(s) 360. As a result, the second annular body 308, the third annular body 340, and the fifth annular body 354 rotate cooperatively or simultaneously relative to the axis 208 during operation of the torque converter 200.

In some examples, to facilitate movably coupling the first and second annular bodies 302, 308 together, the first damper assembly 300 includes one or more example fasteners 370 positioned at or near an inner radius of the first annular body 302 and at or near an outer radius of the second annular body 308, one of which is shown in this example. The fastener(s) 370 may be radially distributed relative to the axis 208. In particular, the fastener(s) 370 of the first damper assembly 300 extend through the first annular body 302 and the second annular body 308 such that the first and second annular bodies 302, 308 cannot separate from each other. Further, to allow the first and second annular bodies 302, 308 to partially rotate relative to each other, the second annular body 308 includes one or more openings or slots (e.g., curved slot(s)) 372 positioned thereon that are configured to slidably receive respective ones of the fasteners 370. As such, during operation of the torque converter 200, each of the fastener(s) 370 slides through a respective one of the slot(s) 372.

As shown in FIG. 3, the second annular body 308 is positioned on the third annular body 340 and extends radially outward relative to the axis 208 to receive the first annular body 302 and/or the damping element(s) 310. In some examples, the second annular body 308 is positioned within and/or partially extends into the first annular body 302, which facilitates maintaining an orientation of the first annular body 302 relative to the second annular body 308. In some such examples, the first annular body 302 forms and/or defines first and second example arms 374, 376 positioned thereon that extend radially inward relative to the axis 208 to receive the second annular body 308 and/or the fastener(s) 370. The first and second arms 374, 376 of FIG. 3 extend along opposing sides of the second annular body 308.

Although FIG. 3 depicts the first annular body 302 movably coupled to the second annular body 308 (i.e., a rotatable portion of the torque converter 200), in some examples, the first annular body 302 is similarly movably or relatively rotatably coupled to a different rotatable portion of the torque converter 200. In such examples, the damping element(s) 310 are similarly interposed between the first annular body 302 and the different rotatable portion such that rotation of the different rotatable portion relative to the first annular body 302 causes the damping element(s) 310 to compress and decompress. For example, the first annular body 302 is configured to movably or relatively rotatably couple to one or more of the cover 202, the impeller 204, the turbine 312, the clutch plate 330, the output portion 334, the support portion 338, the third annular body 340, the fourth annular body 342, the piston 352 the fifth annular body 354, and/or the sixth annular body 356.

In some examples, to facilitate supporting and/or carrying the damping element(s) 310, the first annular body 302 defines one or more example cavities (e.g., radially distributed relative to the axis 208) 378 that are sized, shaped, structured, and/or otherwise configured to receive respective ones of the damping element(s) 310, one of which is shown in this example. That is, each of the damping element(s) 310 is positioned in and/or extends through respective ones of the spring cavities 378. Further, each of the damping element(s) 310 has a first end that engages a portion of the first annular body 302 and a second end, opposite the first end, that engages a portion of the second annular body 308 (and/or a different rotatable portion of the torque converter 200).

According to the illustrated example of FIG. 3, the first damper assembly 300 and/or the damper system 316 includes one or more damping characteristics (e.g., one or more natural frequencies) that are defined by the components associated therewith. In some examples, the damping characteristic(s) are based on Equation (1) below:

$$f = \sqrt{\frac{k}{mr^2}} \quad (1)$$

In some examples, according to Equation (1) above, f represents a value corresponding to a natural frequency of the first damper assembly 300. Further, k represents a value corresponding to a stiffness associated with the first damper assembly 300, which is substantially provided by the damping element(s) 310. Further, m represents a value corresponding to a mass (e.g., a total mass) associated with the first damper assembly 300 that is applied to the damping element(s) 310, which is substantially provided by masses of respective ones of the first annular body 302 and the inertia ring(s) 304, 306 (e.g., when the inertia ring(s) 304, 306 are coupled or connected to the first annular body 302). Further still, $r^2$ represents a value corresponding to a radius associated with the first damper assembly 300. Additionally, the quantity $mr^2$ represents a value corresponding to an inertia (e.g., a total inertia) associated with the first damper assembly 300 that is applied to the damping element(s) 310, which is substantially provided by inertias of respective ones of the first annular body 302 and the ring(s) 304, 306 (e.g., when the ring(s) 304, 306 are coupled or connected to the first annular body 302).

Thus, the natural frequency of the first damper assembly 300 is based on the inertia and/or the mass associated with the first damper assembly 300. As such, if the inertia and/or the mass associated with the first damper assembly 300 changes (e.g., increases or decreases) resulting from expansion and/or contraction of the ring(s) 304, 306 (and/or one or more other inertia rings of the first damper assembly 300), the natural frequency of the first damper assembly 300 also changes (e.g., increases or decreases). In particular, as the inertia and/or the mass applied to the damping element(s) 310 decreases resulting from expansion of the ring(s) 304, 306, the natural frequency of the first damper assembly 300 increases. By increasing the natural frequency of the first damper assembly 300, the first damper assembly 300 is particularly effective in absorbing the torsional vibrations and/or sudden rotational movements of the engine 102 when a speed of the engine 102 is increasing and/or relatively high. Conversely, as the inertia and/or the mass applied to the damping element(s) 310 increases resulting from contraction of the ring(s) 304, 306, the natural frequency of the damper assembly 300 decreases. By decreasing the natural frequency of the first damper assembly 300, the first damper assembly 300 is particularly effective in absorbing the torsional vibrations and/or sudden rotational movements of the engine 102 when the speed of the engine 102 is decreasing and/or relatively low.

Figure 4:
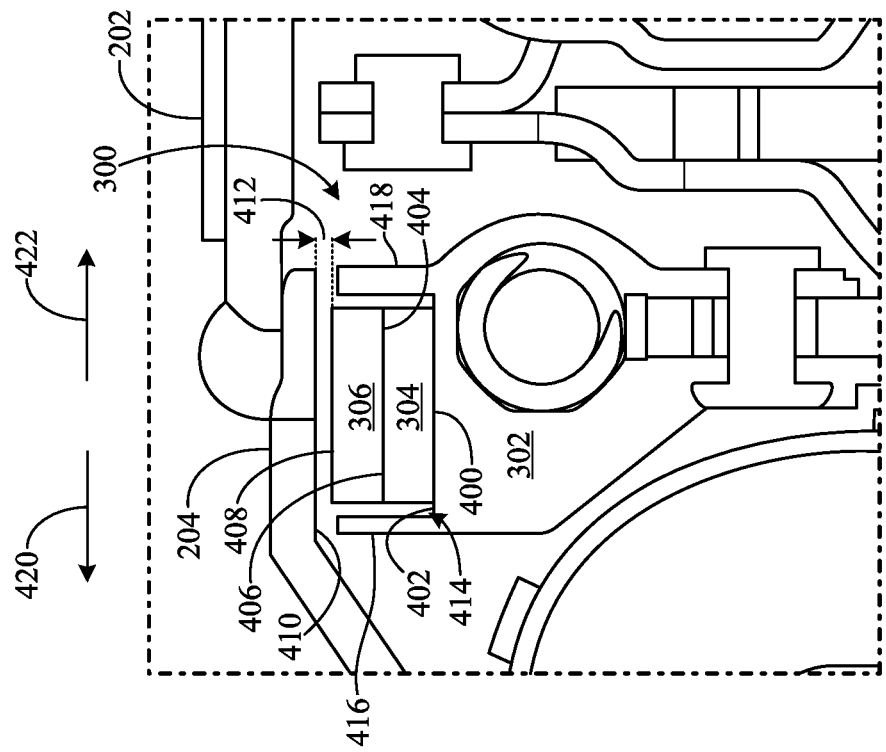
FIG. 4 is an enlarged portion-view of the example damper assembly of FIG. 3 and shows a first example operational state of the example damper assembly of FIG. 3.

FIG. 4 is an enlarged portion-view of the example first damper assembly 300 of FIG. 3 and shows a first example operational state of the first damper assembly 300. According to the illustrated example of FIG. 4, one or more of the first annular body 302, the first ring 304, the second ring 306, and/or, more generally, the first damper assembly 300 is/are rotating (e.g., resulting from engine output) relative to the axis 208 at a rate that is less than a first example rotational speed (e.g., about 1,500 RPM), which provides the first operational state of the first damper assembly 300. In particular, while a rotational speed of the first damper assembly 300 remains below the first rotational speed, the first annular body 302 experiences respective inertias and/or masses of all the ring(s) 304, 306. That is, while the first damper assembly 300 is in the first operational state, each of the ring(s) 304, 306 is substantially coupled or connected to the first annular body 302 resulting from tensions of the respective ring(s) 304, 306 such that the first annular body 302 supports the ring(s) 304, 306. As a result, when in the first operational state, the first damper assembly 300 has a first or initial natural frequency that is defined by the first annular body 302 and the ring(s) 304, 306.

As shown in FIG. 4, the first ring 304 of FIG. 4 includes an inner surface (e.g., a curved and/or circular surface) 400 that is engaging and/or otherwise directly contacting an outer surface (e.g., a curved and/or circular surface) 402 of the first annular body 302. Further, the second ring 306 of FIG. 4 includes an inner surface (e.g., a curved and/or circular surface) 404 that is engaging and/or otherwise directly contacting an outer surface (e.g., a curved and/or circular surface) 406 of the first ring 304. As such, the first ring 304 of FIG. 4 is considered to be in a contracted state, and the second ring 306 of FIG. 4 is considered to be in a contracted state. In some examples, the inner surface 404 of the second ring 306 maintains engagement (e.g., via tension of the second ring 306) with the outer surface 406 of the first ring 304 while the rotational speed of the first damper assembly 300 is below the first rotational speed (i.e., the second ring 306 remains in the contracted state). Further still, the second ring 306 of FIG. 4 also includes an outer surface (e.g., a curved and/or circular surface) 408 that is spaced from an inner surface (e.g., a curved and/or circular surface) 410 associated with the torque converter 200 such that a first example gap (e.g., a relatively small gap and/or a substantially uniform gap) 412 is formed thereby. In some examples, the surface 410 is formed and/or defined by one or more of the cover 202, the impeller 204, and/or a combination thereof.

In some examples, to facilitate holding and/or carrying the ring(s) 304, 306, the first annular body 302 includes an example groove (e.g., an annular groove) 414 that is sized, shaped, structured, and/or otherwise configured to receive the ring(s) 304, 306. As shown in FIG. 4, the first ring 304 and the second ring 306 are positioned in and/or extend through the groove 414. In such examples, the groove 414 of FIG. 4 is positioned at or near an outer radius of the first annular body 302 and extends radially inward relative to the axis 208 to form and/or define the surface 402 of the first annular body 302. In some examples, the groove 414 extends entirely around and/or surrounds the first annular body 302. Additionally, in some examples, the groove 414 forms and/or defines first and second walls 416, 418 of the first annular body 302, which prevents the ring(s) 304, 306 from exiting the groove 414 by moving along the axis 208 in a first direction (e.g., a horizontal direction) 420 and/or a second direction (e.g., a horizontal direction) 422, opposite the first direction 420. In such examples, the first and second walls 416, 418 are positioned at or near an outer radius of the first annular body 302 and extend radially outward relative to the axis 208 along opposing sides of the respective first and second rings 304, 306 and may abut one or more of the sides. For example, if the ring(s) 304, 306 slide and/or otherwise move in the first or second direction 420, 422, the ring(s) 304, 306 abut one of the walls 416, 418 to substantially maintain the ring(s) 304, 306 within the groove 414. Additionally, in some examples, the first and second walls 416, 418 include respective ends that are spaced from the surface 410 by a relatively small distance (e.g., a width of one of the first or second ring 304, 306) to allow rotation of the first annular body 302 while preventing the ring(s) 304, 306 from passing between the wall end(s) and the surface 410.

In some examples, one or more (e.g., all) of the ring(s) 304, 306 of the first damper assembly 300 have respective cross-sectional areas that are substantially rectangular. As shown in FIG. 4, the cross-sectional area of the first ring 304 is rectangular and/or substantially uniform across a length of the first ring 304, which provides a greater area of the inner surface 400 of the first ring 304 to contact the outer surface 402 of the first annular body 302 and a greater area of the outer surface 406 of the first ring 304 to contact the inner surface 404 second ring 306. Similarly, as shown in FIG. 4, the cross-sectional area of the second ring 306 is rectangular and/or substantially uniform across a length of the second ring 306, which provides a greater area of the inner surface 404 of the second ring 306 to contact the outer surface 406 of first ring 304 and a greater area of the outer surface 408 of the second ring 306 to contact the surface 410 associated with the torque converter 200. Additionally, in examples where the first damper assembly 300 is implemented using more than one ring, such rectangular cross-sectional areas facilitate stacking the rings and/or save space within the groove 414. However, in some examples, one or more of the ring cross-sectional areas are shaped differently.

Figure 5:
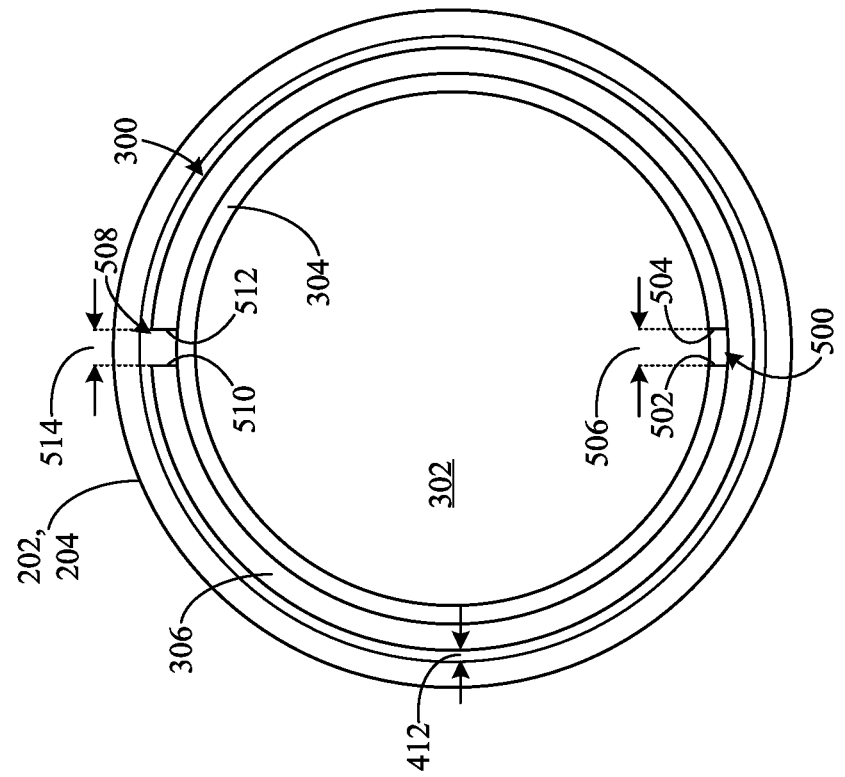
FIG. 5 is a cross-sectional view of the example damper assembly of FIG. 3 along line B-B and shows the first example operational state of the example damper assembly of FIG. 3.

FIG. 5 is a cross-sectional view of the first damper assembly 300 of FIG. 3 along line B-B and shows the first operational state of the first damper assembly 300. According to the illustrated example of FIG. 5, each of the ring(s) 304, 306 is substantially coupled or connected to the first annular body 302. As shown in FIG. 5, the second ring 306 is spaced and/or separated from the cover 202 and/or the impeller 204 to provide the first gap 412 therebetween. As a result, the inertia $mr^2$ and/or the mass m associated with the first damper assembly 300 that is applied to the damping element(s) 310 includes and/or is at least partially defined by the inertia and/or the mass of the first ring 304 and the inertia and/or the mass of the second ring 306. In some examples, to better enable the first ring 304 to expand and/or contract when rotating relative to the axis 208, the first ring 304 includes a first example aperture 500 positioned thereon, as shown in FIG. 5. In some such examples, the first aperture 500 extends entirely through a portion of the first ring 304 to define first and second ends 502, 504 of the first ring 304 that are spaced from each other such that a second example gap (e.g., a relatively small gap and/or a substantially uniform gap) 506 is formed thereby. Similarly, in some examples, the second ring 306 includes a second example aperture 508 positioned thereon, which better enables the second ring 306 to expand and/or contract when rotating relative to the axis 208. In some such examples, the second aperture 508 extends entirely through a portion of the second ring 306 to define first and second ends 510, 512 of the second ring 306 that are spaced from each other such that a third example gap (e.g., a relatively small gap and/or a substantially uniform gap) 514 is formed thereby. Accordingly, in such examples, the first ring 304 is c-shaped and the second ring 306 is c-shaped. Although FIG. 5 depicts each of the ring(s) 304, 306 of the first damper assembly 300 having respective ones of the apertures 500, 508, in some examples, one or more of the rings (e.g., one or more of the first ring 304, the second ring 306, etc.) is/are implemented differently (e.g., see FIG. 11).

Figure 6:
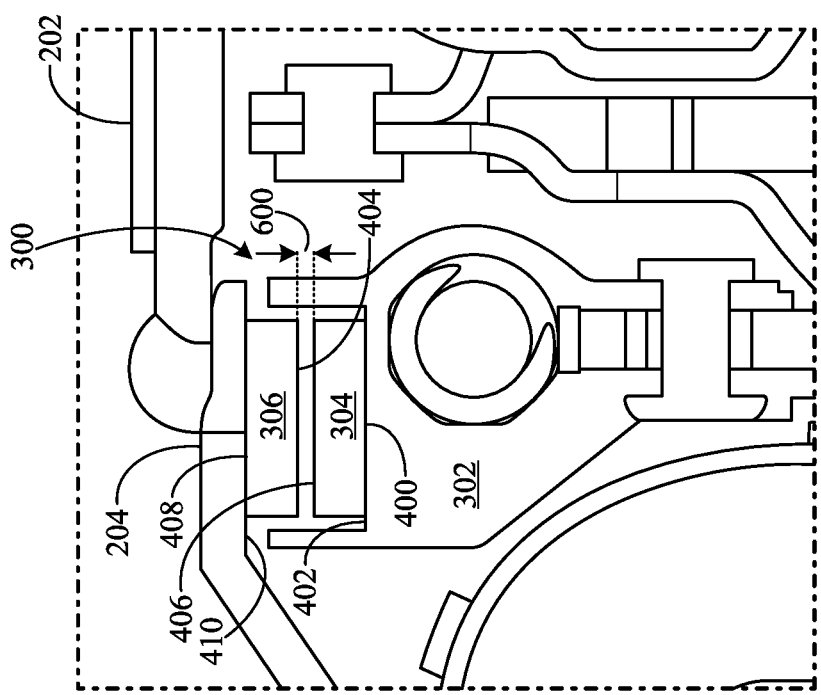
FIG. 6 is another enlarged portion-view of the example damper assembly of FIG. 3 and shows a second example operational state of the example damper assembly of FIG. 3.

FIG. 6 is another enlarged portion-view of the first damper assembly 300 of FIG. 3 and shows a second example operational state of the first damper assembly 300. According to the illustrated example of FIG. 6, one or more of the first annular body 302, the first ring 304, the second ring 306, and/or, more generally, the first damper assembly 300 is/are rotating (e.g., resulting from engine output) relative to the axis 208 at a rate that greater than or equal to the first rotational speed (e.g., about 1,500 RPM) but less than a second example rotational speed (e.g., about 2,500 RPM), which provides the second operational state of the first damper assembly 300. In particular, while the rotational speed of the first damper assembly 300 remains substantially between the first rotational speed and the second rotational speed, the first annular body 302 experiences all of the inertia and/or the mass of the first ring 304 but not all of the inertia and/or the mass of the second ring 306. That is, while the first damper assembly 300 is in the second operational state, only the first ring 304 is substantially coupled or connected to the first annular body 302. On the other hand, as a result of centrifugal or rotational forces experienced by second ring 306 while the first damper assembly 300 is in the second operational state, the second ring 306 expands to substantially decouple or disconnect from the first ring 304. That is, such centrifugal or rotational forces cause the second ring 306 to change from the contracted state to an expanded state. As a result of this expansion of the second ring 306, the inertia $mr^2$ and/or the mass m associated with the first damper assembly 300 that is applied to the damping element(s) 310 decreases in the second operational state compared to the first operational state. In this manner, the natural frequency f of the first damper assembly 300 increases when the first damper assembly 300 changes and/or transitions from the first operational state to the second operational state, which improves damper performance at engine speeds corresponding to the second operational state of the first damper assembly 300. In other words, according to the illustrated example of FIG. 6, the first natural frequency of the first damper assembly 300 changes to a second natural frequency that is greater than the first natural frequency.

Additionally, in some examples, the second ring 306 is configured to expand enough to separate from the first ring 304 when the rotational speed of the second ring 306 is at or above the first rotational speed, which provides a fourth example gap (e.g., a relatively small gap and/or a substantially uniform gap) 600 that is formed by and/or defined between the first ring 304 and the second ring 306. In some such examples, the second ring 306 floats between the first ring 302 and the cover 202 and/or the impeller 204 until the rotational speed of the second ring 306 decreases or further increases. For example, if the rotational speed of the second ring 306 further increases, the second ring 306 further expands to engage and/or otherwise directly contact the cover 202 and/or the impeller 204. In such examples, the second ring 306 maintains engagement with the torque converter surface 410 until the rotational speed of the second ring 306 is at or below the first rotational speed (i.e., the second ring 306 remains in the expanded state).

As shown in FIG. 6, the inner surface 400 of the first ring 304 is still engaging and/or otherwise directly contacting the outer surface 402 of the first annular body 302. In some examples, the inner surface 400 of the first ring 304 maintains engagement (e.g., via tension of the first ring 304) with the outer surface 402 of the first annular body 302 while the rotational speed of the first damper assembly 300 is below the second rotational speed (i.e., the first ring 304 remains in the contracted state). However, the inner surface 404 of the second ring 306 is separated and/or spaced from the outer surface 406 of the first ring 304 to provide the fourth gap 600. That is, the first gap 412, which exists between the outer surface 408 of the second ring 306 and the torque converter surface 410 when the first damper assembly 300 is operating in the first operational state, is closed. Further still, the outer surface 408 of the second ring 306 is engaging and/or otherwise directly contacting the inner surface 410 associated with the torque converter 200 such that the cover 202 and/or the impeller 204 experience the inertia of the second ring 306. Stated differently, according to the illustrated example of FIG. 6, the inertia and/or the mass of the second ring 306 is shifted or transferred from the first annular body 302 to the cover 202 and/or the impeller 204 when the first damper assembly 300 changes and/or transitions from the first operational state to the second operational state.

Figure 7:
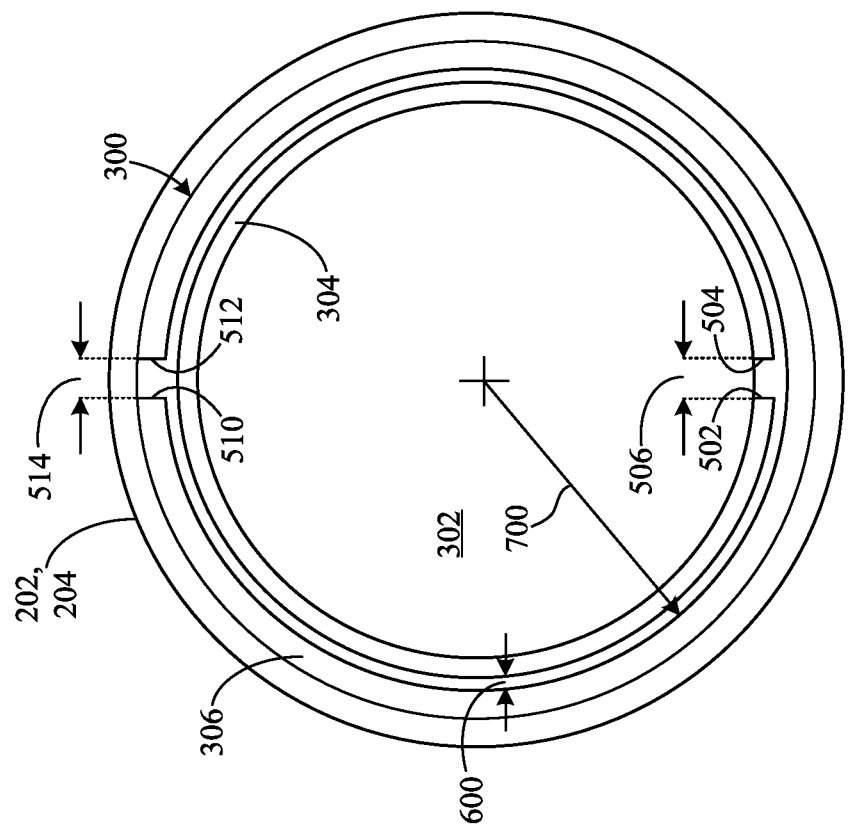
FIG. 7 is another cross-sectional view of the example damper assembly of FIG. 3 along line B-B and shows the second example operational state of the example damper assembly of FIG. 3.

FIG. 7 is another cross-sectional view of the first damper assembly 300 of FIG. 3 along line B-B and shows the second operational state of the first damper assembly 300. According to the illustrated example of FIG. 7, the first ring 304 is substantially coupled or connected to the first annular body 302 and the second ring 306 is substantially coupled or connected to the cover 202 and/or the impeller 204. The second ring 306 of FIG. 7 is spaced and/or separated from the first ring 304 to provide the fourth gap 600 therebetween. As a result, the inertia $mr^2$ and/or the mass m associated with the first damper assembly 300 that is applied to the damping element(s) 310 includes and/or is partially defined by the inertia and/or the mass of the first ring 304 but not the inertia and/or the mass of the second ring 306. Due to the centrifugal or rotational forces experienced by the second ring 306 when the first damper assembly 300 is in the second operational state, the first and second ends 510, 512 of the second ring 306 move away from each other, which increases the third gap 514 between the ends 510, 512 and/or otherwise increases a radius 700 (and/or a diameter) of the second ring 306. On the other hand, the first and second ends 502, 504 of the first ring 304 of FIG. 7 do not substantially move away from each other to maintain a size of the second gap 506 therebetween. Stated differently, the first ring 304 does not substantially expand and/or otherwise remains in the contracted state when the rotational speed of the first ring 304 is between the first rotational speed and the second rotational speed.

Figure 8:
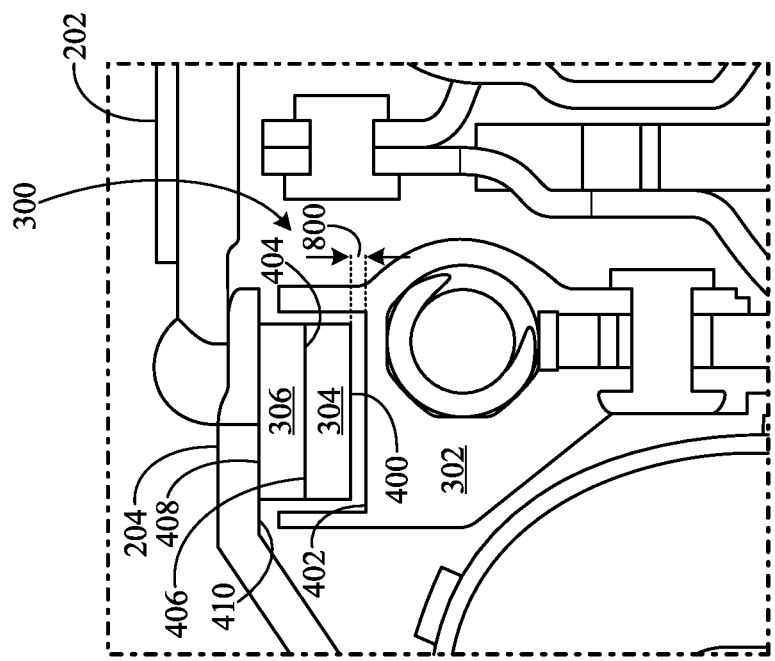
FIG. 8 is another enlarged portion-view of the example damper assembly of FIG. 3 and shows a third example operational state of the example damper assembly of FIG. 3.

FIG. 8 is another enlarged portion-view of the first damper assembly 300 of FIG. 3 and shows a third example operational state of the first damper assembly 300. According to the illustrated example of FIG. 8, one or more of the first annular body 302, the first ring 304, the second ring 306, and/or, more generally, the first damper assembly 300 is/are rotating (e.g., resulting from engine output) relative to the axis 208 at a rate that is greater than or equal to the second rotational speed (e.g., about 2,500 RPM), which provides the third operational state of the first damper assembly 300. In particular, while the rotational speed of the first damper assembly 300 remains substantially above the second rotational speed, the first annular body 302 does not experience all of the inertia and/or the mass of the first ring 304 or all of the inertia and/or the mass of the second ring 306. That is, while the first damper assembly 300 is in the third operational state, none of the rings 304, 306 is substantially coupled or connected to the first annular body 302. Similar to the second ring 306, the first ring 304 of FIG. 8 expands to substantially decouple or disconnect from the first annular body 302 resulting from centrifugal or rotational forces experienced by first ring 304 while the first damper assembly 300 is in this third operational state. That is, such centrifugal or rotational forces cause the first ring 304 to change from the contracted state to an expanded state. As a result of this expansion of the first ring 304, the inertia $mr^2$ and/or the mass m associated with the first damper assembly 300 that is applied to the damping element(s) 310 further decreases when the third operational state relative to the second operational state. In this manner, the natural frequency f of the first damper assembly 300 further increases when the first damper assembly 300 changes and/or transitions from the second operational state to the third operational state, which further improves damper performance at engine speeds corresponding to the third operational state of the first damper assembly 300. In other words, according to the illustrated example of FIG. 8, the second natural frequency of the first damper assembly 300 changes to a third natural frequency that is greater than the second natural frequency.

Additionally, in some examples, the first ring 304 is configured to expand enough while rotating to separate from the first annular body 302 when the rotational speed of the first ring 304 is at or above the second rotational speed, which provides a fifth example gap (e.g., a relatively small gap and/or a substantially uniform gap) 800 that is formed by and/or defined between the first ring 304 and the first annular body 302. In some such examples, the first ring 304 floats between the first annular body 302 and the second ring 306 until the rotational speed of the first ring 304 decreases or further increases. For example, if the rotational speed of the first ring 304 further increases, the first ring 304 further expands to engage and/or otherwise directly contact the second ring 306. In such examples, the first ring 304 maintains engagement with the second ring 306 until the rotational speed of the first ring 304 is at or below the second rotational speed (i.e., the first ring 304 remains in the expanded state).

As shown in FIG. 8, the inner surface 400 of the first ring 304 is separated and/or spaced from the outer surface 402 of the first annular body 302 to provide the fifth gap 800. Further, the inner surface 404 of the second ring 306 is engaging and/or otherwise directly contacting the outer surface 406 of the first ring 304 resulting from the expansion of the first ring 304. That is, the fourth gap 600, which exists between the first and second rings 304, 306 while the first damper assembly 300 is operating in the second operational state, is closed. Further still, the outer surface 408 of the second ring 306 is still engaging and/or otherwise directly contacting the inner surface 410 associated with the torque converter 200. As a result, the cover 202 and/or the impeller 204 experience the inertia and/or the mass of the first ring 304 and the inertia and/or the mass of second ring 306. Stated differently, according to the illustrated example of FIG. 8, the inertia and/or the mass of the first ring 304 is shifted or transferred from the first annular body 302 to the cover 202 and/or the impeller 204 when the first damper assembly 300 changes and/or transitions from the second operational state to the third operational state.

Figure 9:
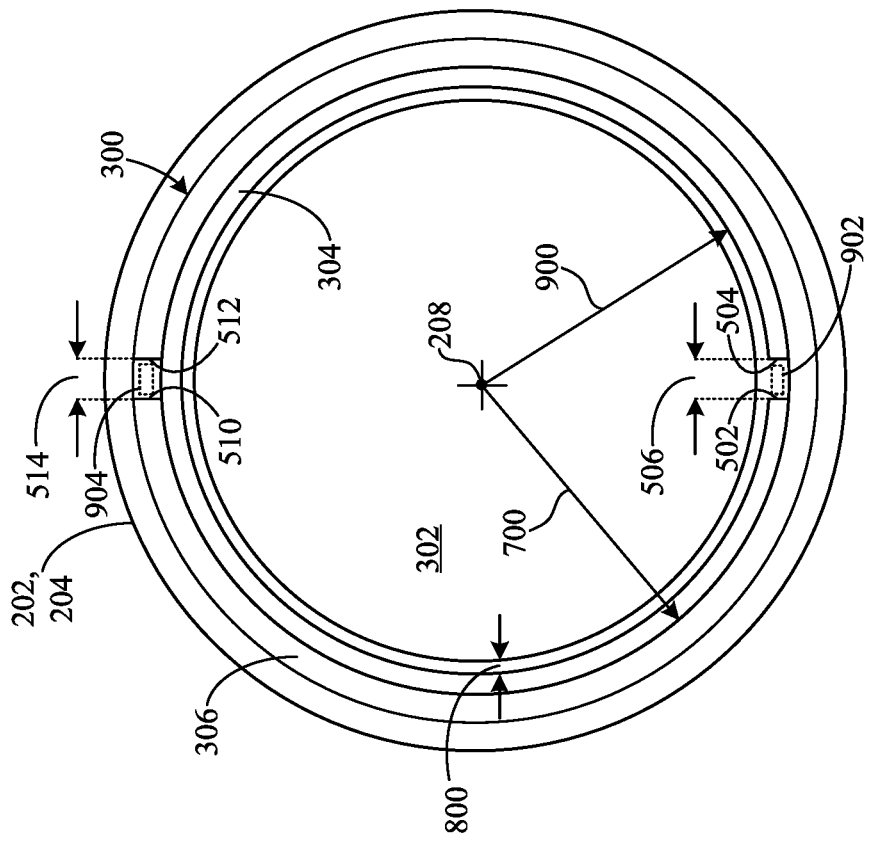
FIG. 9 is another cross-sectional view of the example damper assembly of FIG. 3 along line B-B and shows the third example operational state of the example damper assembly of FIG. 3.

FIG. 9 is another cross-sectional view of the first damper assembly 300 of FIG. 3 along line B-B and shows the third operational state of the first damper assembly 300. According to the illustrated example of FIG. 9, the first ring 304 and the second ring 306 are substantially coupled or connected to the cover 202 and/or the impeller 204. The first ring 304 of FIG. 9 is spaced and/or separated from the first annular body 302 to provide the fifth gap 800 therebetween. As a result, the inertia $mr^2$ and/or the mass m associated with the first damper assembly 300 that is applied to the damping element(s) 310 does not include and/or is not defined by the inertia and/or the mass of the first ring 304 or the inertia and/or the mass of the second ring 306. Due to centrifugal or rotational forces experienced by the first ring 304 when the first damper assembly 300 is in the third operational state, the first and second ends 502, 504 of the first ring 304 move away from each other, which increases the second gap 506 between the ends 502, 504 and/or otherwise increases a radius 900 (and/or a diameter) of the first ring 304. Stated differently, the first ring 304 expands and the second ring 306 maintains expanded when the first damper assembly 300 is in the third operational state. That is, the first and second ends 510, 512 of the second ring 306 of FIG. 9 do not substantially move away from each other to maintain a size of the third gap 514 therebetween and/or the radius 700 of the second ring 306 compared to when the first damper assembly 300 is operating in the second operational state (i.e., the second ring 306 does not further expand when the first damper assembly 300 is in the third operational state).

In some examples, the first annular body 302, the first ring 304, and the second ring 306 are concentric, as shown in FIG. 9. That is, in such examples, the first annular body 302, the first ring 304, and the second ring 306 are positioned on the same axis 208. Additionally, in some examples, to facilitate controlling the expansion and/or the contraction of the first ring 304, the first ring 304 includes a first example biasing element (e.g., a spring) 902 (as represented by the dotted/dashed lines of FIG. 9) operatively coupled to and/or interposed between the first and second ends 502, 504 of the first ring 304 (i.e., positioned in the first aperture 500). In such examples, the first biasing element 902 provides tension to the first ring 304. Similarly, in some examples, to facilitate controlling the expansion and/or the contraction of the second ring 306, the second ring 306 also includes a second example biasing element (e.g., a spring) 904 (as represented by the dotted/dashed lines of FIG. 9) coupled to and/or interposed between the first and second ends 510, 512 of the second ring 306 (i.e., positioned in the second aperture 508). In such examples, the second biasing element 904 provides tension to the second ring 306.

As shown in FIG. 9, the second ring 306 is positioned on the first ring 304 such that the rings 306, 308 are in a stacked position or orientation. In such examples, the first ring 304 is considered to be an inner ring, and the second ring 306 is considered to be an outer ring. Although FIG. 9 depicts the first ring 304 and the second ring 306 in the stacked orientation, in some examples, the first ring 304 and the second ring 306 (and/or one or more other rings of the first damper assembly 300) are positioned on the first annular body 302 differently. For example, the rings 304, 306 may be adjacent to each other when positioned on the first annular body 302.

Although FIGS. 3-9 depict the first damper assembly 300 having the two inertia rings 304, 306, in some examples, the first damper assembly 300 is implemented with a single inertia ring or more than two (e.g., 3, 4, 5, etc.) inertia rings. In examples where the first damper assembly 300 includes multiple inertia rings 304, 306, the multiple inertia rings 304, 306 are configured to successively decouple or disconnect from the first annular body 302 according to a first order as the rotational speed of the first damper assembly 300 increases. For example, as the rotational speeds of the respective inertia rings 304, 306 increase and/or are at or above of the first rotational speed, the second ring 306 first substantially expands (e.g., the radius 700 of the second ring 306 increases) to decouple or disconnect from the first ring 304 and first annular body 302, thereby increasing the natural frequency f of the first damper assembly 300. Then, in this example, as the rotational speeds of the respective inertia rings 304, 306 further increase and/or are at or above the second rotational speed, the first ring 304 substantially expands (e.g., the radius 900 of the first ring 306 increases) to decouple or disconnect from the first annular body 302, thereby further increasing the natural frequency f of the first damper assembly 300.

Conversely, in such examples, the multiple inertia rings 304, 306 are configured to successively recouple or reconnect to the first annular body 302 according to a second order, opposite to the first order, as the rotational speed of the first damper assembly 300 decreases. For example, as the rotational speeds of the respective inertia rings 304, 306 decrease and/or are below the second rotational speed, the first ring 304 first substantially contracts (e.g., the radius 900 of the first ring 304 decreases via the tension of the first ring 304) to recouple or reconnect to the first annular body 302, thereby decreasing the natural frequency f of the first damper assembly 300. Then, in this example, as the rotational speeds of the inertia rings 304, 306 further decrease and/or are below the first rotational speed, the second ring 306 also substantially contracts (e.g., the radius 700 of the second ring 306 decreases via the tension of the second ring 306) to recouple or reconnect to the first ring 304 and the first annular body 302, thereby further decreasing the natural frequency f of the first damper assembly 300.

Figure 10:
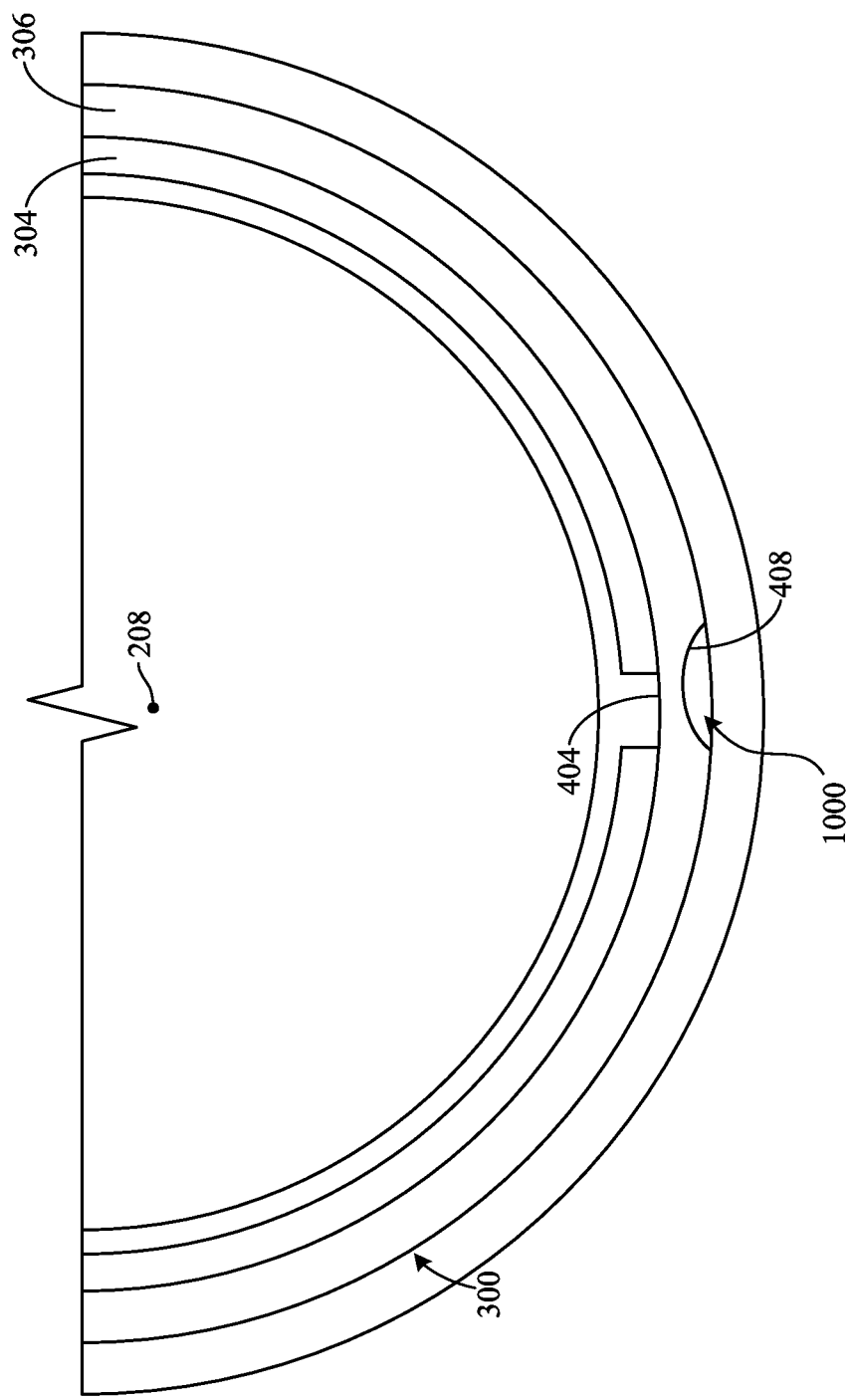
FIGS. 10 and 11 are other cross-sectional views of the example damper assembly of FIG. 3 along line B-B and show example inertia rings in accordance with the teachings of this disclosure.

FIG. 10 is another cross-sectional view of the first damper assembly 300 of FIG. 3 along line B-B and shows the first and second inertia rings 304, 306. In some examples, to facilitate controlling ring expansion and contraction, the second ring 306 includes an example recessed area (e.g., a notch) 1000 positioned thereon. For example, as shown in FIG. 10, the recessed area 1000 is positioned opposite relative to the first and second ends 510, 512 of the second ring 306 such that the recessed area 1000 and the first and second ends 510, 512 are substantially positioned along the same axis. As a result, the recessed area 1000 balances the second ring 306 and/or better enables the second ring 306 to bend to change the radius 700 of the second ring 306 by decreasing strength and/or rigidity of the second ring 306 (i.e., by weakening the second ring 306). Stated differently, the recessed area 1000 better enables the first and second ends 510, 512 to move relative to each other.

In some examples, the recessed area 1000 is positioned on the outer surface 408 of the second ring 306 and extends radially inward relative to the axis 208, as shown in FIG. 10. Additionally or alternatively, in some examples, the recessed area 1000 (and/or a different recessed area) is positioned on the inner surface 404 of the second ring 306 and extends radially outward relative to the axis 208. Although FIG. 10 depicts only the second ring 306 having the recessed area 1000, in some examples, one or more (e.g., all) of the other inertia rings (e.g., the first ring 304) of the first damper assembly 300 likewise include one or more respective recessed areas.

Figure 11:
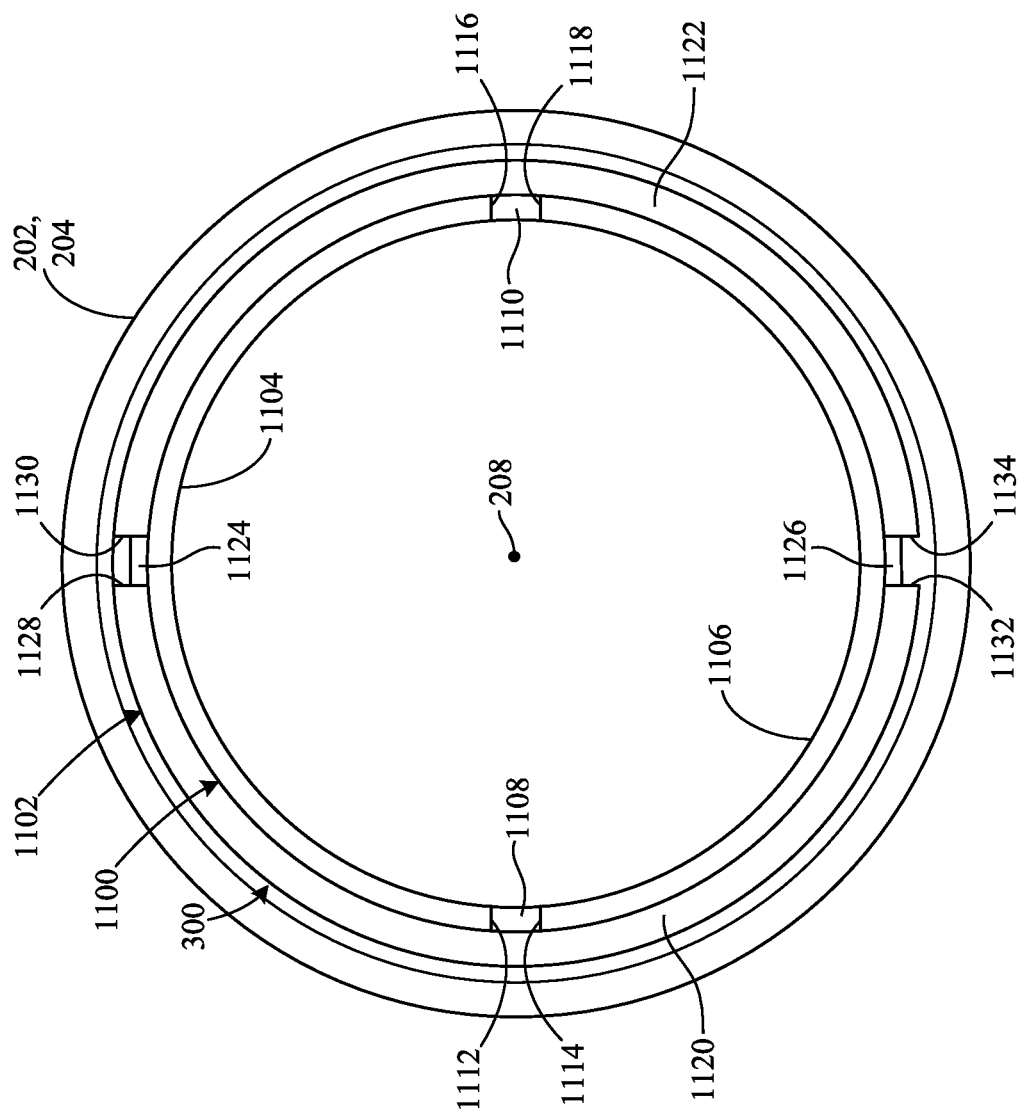

FIG. 11 is another cross-sectional view of the first damper assembly 300 of FIG. 3 along line B-B and shows third and fourth example inertia rings (e.g. snap ring(s)) 1100, 1102. In some examples, the third and fourth rings 1100, 1102 correspond to the respective first and second rings 304, 306 and/or are otherwise used to implement the first damper assembly 300. For example, the third and fourth rings 1100, 1102 may be positioned on the first annular body 302 and/or within the groove 414. In particular, the third and fourth rings 1100, 1102 are configured to expand and/or contract based on rotational speeds of the respective third and fourth rings 1100, 1102 relative to the axis 208, which changes the inertia and/or the mass of the first annular body 302 and, thus, changes the natural frequency f of the first damper assembly 300 during operation of the torque converter 200.

The third ring 1100 of FIG. 11 includes multiple (e.g., 2, 3, 4, etc.) example portions (e.g., semi-circular shaped portions) 1104, 1106 movably or non-fixedly coupled together, two of which are shown in this example (i.e., a first portion 1104 and a second portion 1106). As shown in FIG. 11, each of the first and second portions 1104, 1106 of the third ring 1100 is c-shaped. In particular, to facilitate controlling the portions 1104, 1106 of the third ring 1100 moving away from and toward each other when the third ring 1100 is rotating (i.e., to facilitate controlling expansion and contraction of the third ring 1100), the third ring 1100 includes one or more biasing elements (e.g., spring(s) such as tension spring(s)) 1108, 1100 coupled to and/or interposed between the portions 1104, 1106 of the third ring 1100, two of which are shown in this example (i.e., a third biasing element 1108 and a fourth biasing element 1110). In some examples, the third biasing element 1108 is coupled to and/or interposed between first ends 1112, 1114 of the respective portions 1104, 1106. Further, in such examples, the fourth biasing element 1110 is coupled to and/or interposed between second ends 1116, 1118 of the respective portions 1104, 1106. As a result, the third and fourth biasing elements 1108, 1110 provide tension to the third ring 1100 and/or the portions 1104, 1106 thereof.

Additionally, in some examples, the fourth ring 1102 similarly includes multiple (e.g., 2, 3, 4, etc.) example portions (e.g., semi-circular shaped portions) 1120, 1122 movably or non-fixedly coupled together, two of which are shown in this example (i.e., a first portion 1120 and a second portion 1122). As shown in FIG. 11, each of the first and second portions 1120, 1122 of the fourth ring 1102 is c-shaped. In particular, the to facilitate controlling the portions 1120, 1122 of the fourth ring 1102 moving away from and toward each other during operation of the first damper assembly 300 (i.e., to facilitate controlling expansion and contraction of the fourth ring 1102), the fourth ring 1102 includes one or more biasing elements (e.g., spring(s) such as tension spring(s)) 1124, 1126 coupled and/or interposed between the portions 1120, 1122 of the fourth ring 1102, two of which are shown in this example (i.e., a fifth biasing element 1124 and a sixth biasing element 1126). In some examples, the fifth biasing element 1124 is coupled to and/or interposed between first ends 1128, 1130 of the respective portions 1120, 1122. Further, in such examples, the sixth biasing element 1126 is coupled to and/or interposed between second ends 1132, 1134 of the respective portions 1120, 1122. As a result, the fifth and sixth biasing elements 1124, 1126 provide tension to the fourth ring 1102 and/or the portions 1120, 1122 thereof.

In some examples, one or more of the ring(s) 304, 306 of FIGS. 3-10 and/or the ring(s) 1100, 1102 of FIG. 11 is/are constructed one or more metals having appropriate mechanical properties and/or characteristics such as, for example, spring steel. In particular, one or more of the ring(s) 304, 306, 1100, 1102 and/or the component(s) associated therewith (e.g., one or more of the biasing element(s) 902, 904, 1108, 1110, 1124, 1126) is/are sized, shaped, structured, and/or otherwise configured such that each ring 304, 306, 1100, 1102 substantially expands and/or contracts to change the natural frequency f of the first damper assembly 300 when the first annular body 302 is rotating relative to the axis 208 at or near a particular rotational speed (e.g., 1,500 RPM, 2,000 RPM, 2,500 RPM, etc.) and/or within a range of rotational speeds (e.g., between about 1,450 and about 1,550 RPM, between about 1,950 RPM and about 2,050 RPM, between about 2,450 RPM and about 2,550 RPM, etc.). As such, the aforementioned rotational speeds (e.g., the first rotational speed, the second rotational speed, etc.) associated with the first damper assembly 300 changing and/or transitioning between the operational states thereof are predetermined. Thus, in some examples, one or more of the inertia ring(s) 304, 306, 1100, 1102 and/or the component(s) associated therewith is/are shaped, sized, structured, and/or otherwise configured differently to provide one or more other predetermined rotational speeds for the first damper assembly 300 in addition or alternatively to the first rotational speed and/or the second rotational speed.

It will be appreciated that tilger apparatus for use with rotating bodies disclosed in the foregoing description provide numerous advantages. Examples disclosed herein provide a damper assembly (e.g., a tilger) having one or more detachable inertia rings that is/are configured to change a natural frequency of the damper assembly during operation of a rotating body (e.g., a torque converter), which improves damper performance through substantially wide range of engine speeds.

Although certain example apparatus and articles of manufacture have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A tilger for a rotating body, comprising:
   an annular body movably coupled to a rotatable portion of the rotating body;
   a spring interposed between the first annular body and the rotatable portion, rotation of the rotatable portion relative to the annular body to compress and decompress the spring; and
   a ring positioned on an outer surface of the annular body and configured to expand as a rotational speed of the ring increases to decrease a total inertia of the annular body and the ring applied to the spring.

2. The tilger of claim 1, wherein the ring includes an inner surface that maintains engagement with the outer surface of the annular body while the rotational speed of the ring is below a first predetermined rotational speed.

3. The tilger of claim 2, wherein the ring disconnects from the annular body when the rotational speed of the ring is at or above the first predetermined rotational speed.

4. The tilger of claim 3, wherein the inner surface of the ring separates from the outer surface of the annular body to form a gap between the inner and outer surfaces when the rotational speed of the ring is at or above the first predetermined rotational speed.

5. The tilger of claim 1, wherein the first annular body includes an annular groove positioned at or near an outer radius thereof in which the ring is positioned.

6. The tilger of claim 5, wherein the annular groove defines first and second walls that extend along respective sides of the ring to prevent the ring from exiting the annular groove.

7. The tilger of claim 1, wherein the ring is c-shaped such that the ring has first and second ends that are spaced from each other, and wherein the first and second ends of the ring move away from each other as the ring expands to increase a diameter of the ring.

8. The tilger of claim 7, wherein the ring includes a recessed area positioned thereon between the two ends to balance the ring.

9. The tilger of claim 1, wherein the ring includes a first portion and a second portion that are movably coupled together.

10. The tilger of claim 9, wherein the ring includes a first spring coupled between first ends of the respective first and second portions and a second spring coupled between second ends of the respective first and second portions to provide tension to the ring.

11. The tilger of claim 1, wherein the ring is a first ring and the tilger further includes a second ring positioned on the first ring, the second ring configured to expand as a rotational speed of the second ring increases to further decrease the total inertia applied to the spring.

12. The tilger of claim 11, wherein the second ring disconnects from the first ring when a rotational speed of the second ring is at or above a second predetermined rotational speed.

13. The tilger of claim 12, wherein the rotating body is a vehicle torque converter and an outer surface of the second ring engages an inner surface of a cover or an impeller of the vehicle torque converter when the rotational speed of the second ring is at or above the second predetermined rotational speed.

14. The tilger of claim 12, wherein the first ring disconnects from the first annular body when the rotational speed of the first ring is at or above the first predetermined rotational speed greater than the second predetermined rotational speed.

15. The tilger of claim 14, wherein an outer surface of the first ring engages an inner surface of the second ring when the rotational speed of the first ring is at or above the first predetermined rotational speed.

16. The tilger of claim 3, wherein the rotating body is a vehicle torque converter.

17. The tilger of claim 16, wherein the rotatable portion of the vehicle torque converter is a damper plate of a torsional damper consists a damper input portion, a damper output portion or an intermediate portion located among successive damping elements or a turbine shell.

18. The tilger of claim 16, wherein an outer surface of the ring engages an inner surface of a cover or an impeller of the vehicle torque converter when the rotational speed of the ring is at or above the first predetermined rotational speed.

19. A vehicle torque converter, comprising:
   a cover to receive an engine torque;
   an output portion to receive the engine torque from the cover and provide the engine torque to a vehicle transmission system; and
   a damper system operatively interposed between the cover and the output portion to dampen relative rotational movement between the cover and the output portion when a clutch of the vehicle torque converter is in an engaged state, the damper system including a rotatable portion and one or more rings supported by the rotatable portion that at least partially define a natural frequency of the damper system, each of the one or more rings configured to change between contracted and expanded states in response to rotation of the rotatable portion to change the natural frequency.

20. The vehicle torque converter of claim 19, wherein the one or more rings are configured to (a) successively disconnect from the rotatable portion as a rotational speed of the rotatable portion increases and (b) successively reconnect to the rotatable portion as the rotational speed decreases.

* * * * *